United States Patent [19]
Dube

[11] Patent Number: 5,982,938
[45] Date of Patent: Nov. 9, 1999

[54] SYSTEM AND METHOD FOR COMPRESSING DATA USING DIFFERENTIAL CODING OF COEFFICIENT ADDRESSES

[75] Inventor: Simant Dube, Alpharetta, Ga.

[73] Assignee: Iterated Systems, Inc., Atlanta, Ga.

[21] Appl. No.: 08/829,765

[22] Filed: Mar. 31, 1997

[51] Int. Cl.[6] .................................................. G06K 9/36
[52] U.S. Cl. ............................................................ 382/240
[58] Field of Search .................................. 382/232, 239, 382/240, 248, 260

[56] References Cited

U.S. PATENT DOCUMENTS

| | | | |
|---|---|---|---|
| 4,751,742 | 6/1988 | Meeker | 382/248 |
| 4,858,017 | 8/1989 | Torbey | 382/240 |
| 5,068,911 | 11/1991 | Resnikoff et al. | 382/260 |
| 5,122,875 | 6/1992 | Raychaudhuri et al. | 382/239 |
| 5,278,915 | 1/1994 | Chupeau et al. | 382/240 |
| 5,384,869 | 1/1995 | Wilkinson et al. | 382/260 |

FOREIGN PATENT DOCUMENTS

| | | |
|---|---|---|
| 0817494A2 | 1/1998 | European Pat. Off. . |
| 08186815 | 7/1996 | Japan . |
| 2281465 | 3/1995 | United Kingdom . |
| 2293733 | 4/1996 | United Kingdom . |
| WO 96/09718 | 3/1996 | WIPO . |

*Primary Examiner*—Jose L. Couso
*Attorney, Agent, or Firm*—Morris, Manning & Martin, L.L.P.

[57] ABSTRACT

In one method of the present invention a plurality of thresholds ranges is selected. A first coefficient of the tree structure is compared against the plurality of threshold ranges during a first single traversal of the tree structure and a second coefficient of the tree structure against the plurality of threshold ranges during the first single traversal of the tree structure. The method of the present invention also determines whether the first or second coefficient satisfies a selected condition with respect to either of the threshold ranges. The difference in addresses between the addresses of the first and second coefficients is determined if the first and second coefficient satisfy the selected condition. The method of the present invention then codes the location of the second coefficient based on the address of the first coefficient using the difference.

15 Claims, 16 Drawing Sheets

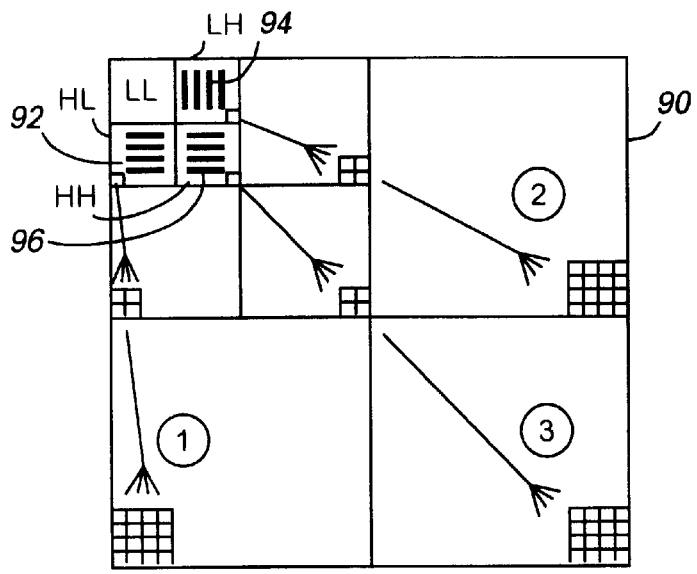
FIG. 5A
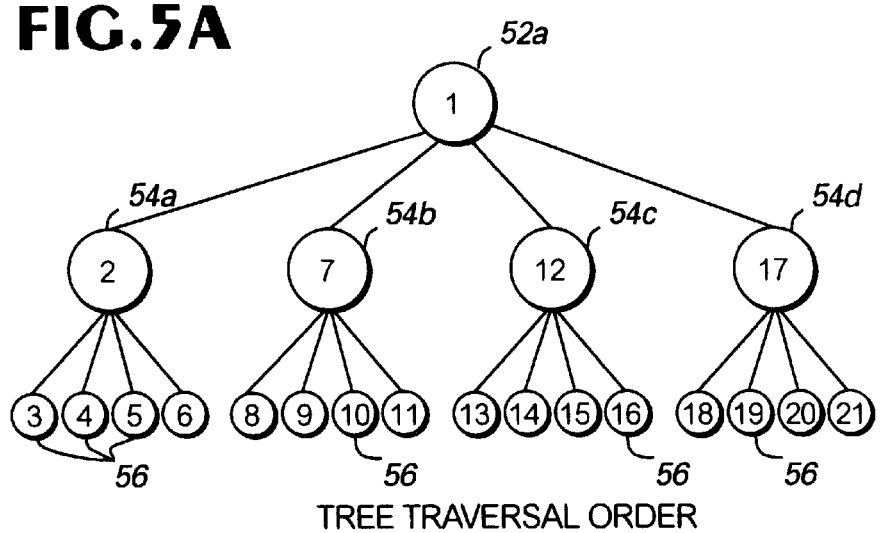
TREE TRAVERSAL ORDER
FIG. 5B
TREE ENCODING/
DECODING SYMBOLS
| SIGNIFICANCE/ INSIGNIFICANCE SYMBOLS | CONDITION |
|---|---|
| | |
| S1: SIGNFNT | $2T \leq x\,MAG < 4T$ |
| S2: SIGNFNT | $T \leq x\,MAG < 2T$ |
FIG. 6

1ST ITERATION (52q) [1 1] [1] 0 0 0 1 1 0 1    BINARY REPRESENTATION 9 8 7 6 5 4 3 2 1 0    BIT PLANES ($K^{++}$ BITS)

512    32    4    THRESHOLD VALUES ($2^K$)

(54w) [1 1] [0] 1 1 1 0 0 1 0    BINARY REPRESENTATION 9 8 7 6 5 4 3 2 1 0    BIT PLANES ($K^{++}$ BITS)

256    16    2    THRESHOLD VALUES ($2^K$)

| SIGNIFICANCE SYMBOL | THRESHOLD | BIT PLANE REPRESENTATION |
|---|---|---|
| S2 | $T < x < 2T$ | $K+1^{+h} = 0$ & $K^{+h} = 1$ |
| S1 | $2T < x < 4T$ | $K+1^{+h} = 1$ |

700

COEFFICIENT POSITIONS

ABSOLUTE ADDRESSES

HUFFMAN TABLE SELECTION

| SIGNIFICANT COEFFICIENT | TABLE NO. | POSITION DIFFERENCE |
|---|---|---|
| (2,0) | TABLE 0 | 0 |
| (2,2) | TABLE 2 | 2 |
| (1,1) | TABLE 2 | 1 |
| (2,3) | TABLE 1 | 1 |
| (2,6) | TABLE 1 | 1 |
| (1,2) | TABLE 1 | 1 |

DIFFERENTIAL ADDRESSES

RUN LENGTH CODE

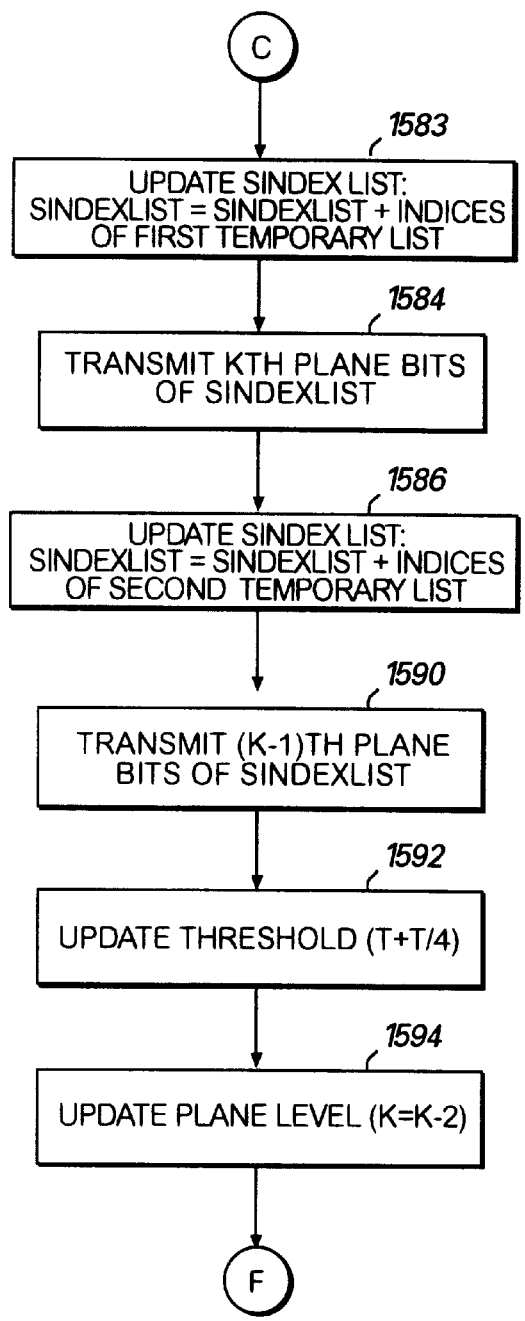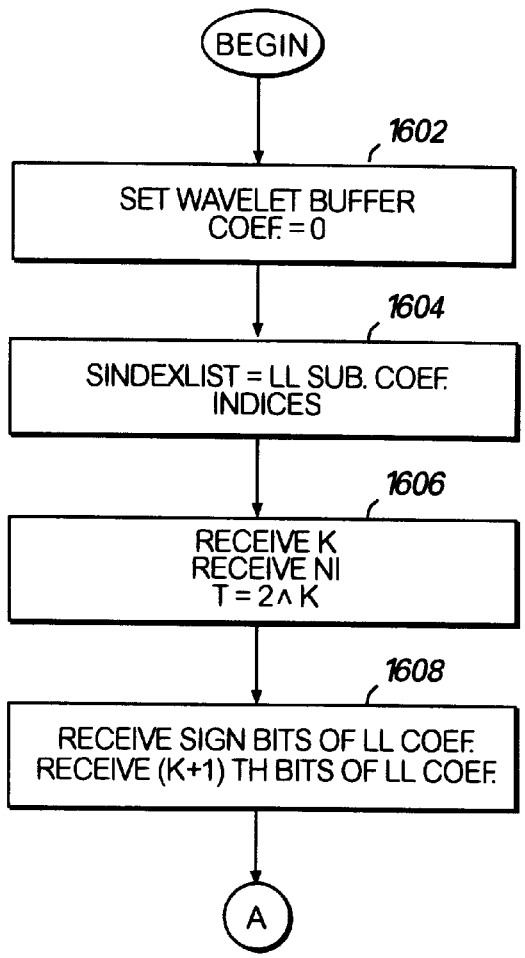
FIG.15D                   FIG.16A

SYSTEM AND METHOD FOR COMPRESSING DATA USING DIFFERENTIAL CODING OF COEFFICIENT ADDRESSES

FIELD OF THE INVENTION

The present invention relates to data compression techniques and particularly relates image compression using wavelet transforms.

BACKGROUND OF THE INVENTION

Many types of data compression systems have been developed for use in various systems. Generally, data compression systems eliminate or reduce redundancies in the data of a file. Data compression systems are useful to represent information as accurately as possible with a minimum number of bits and thus minimize the amount of data which must be stored or transmitted in an information storage or transmission system. One way of doing this is to remove redundant or less significant information from the original data. A well-known compression technique is often referred to as zerotree compression.

In zerotree compression, a signal compression system applies a hierarchical subband decomposition, or wavelet transform, followed by an iterative successive approximation entropy-coded quantizer that incorporates zerotrees as discussed below. Wavelet transforms are used for low bit rate image compression because a wavelet transform leads to a hierarchical multi-scale representation of the source image. A significance map codes whether a coefficient in a discrete wavelet transform has a zero or nonzero quantized value. Typically, a large fraction of the bit budget for a computer system must be spent on encoding the significance map. Thus, a significant improvement in encoding the significance map translates into a significant improvement in the compression of information preparatory to storage or transmission.

One method of improving the encoding of a significance map is to define a data structure called a zerotree as known in the art. In zerotree encoding, a wavelet coefficient is said to be insignificant with respect to a given threshold T if the coefficient has a magnitude less than T. A wavelet coefficient that has a magnitude greater than or equal to T is said to be significant. Zerotree compression is based on the hypothesis that if a wavelet coefficient identified at a coarse frequency scale is insignificant with respect to a given threshold T, then all wavelet coefficients of the same orientation in the same spatial location at finer scales of the hierarchical subband decomposition are likely to be insignificant with respect to T. If this hypothesis is met, the identified wavelet coefficient is considered a zerotree root (zerotree).

More specifically, in a hierarchical subband system, with the exception of the highest frequency subbands, every coefficient at a given scale can be related to a set of coefficients at the next finer scale of similar orientation. The coefficient at the given scale is called the parent node, and all coefficients corresponding to the same spatial or temporal location at the next finer scale of similar orientation are called child nodes. For a given parent node, the set of all coefficients at all finer scales of similar orientation corresponding to the same location are called descendants. Similarly, for a given child node, the set of coefficients at all coarser scales of similar orientation corresponding to the same location are called ancestors. Coefficients or nodes at the same scale are called sibling modes. With the exception of the lowest frequency subband, all parent nodes have four child nodes. In the lowest frequency subband, the parent-child relationship is defined such that each parent node has three child nodes.

The scanning of the coefficients is performed such that no child node is scanned before any of its parent nodes. In these systems, sibling nodes are scanned first before scanning any of the children nodes of the sibling nodes. Given a threshold level to determine whether or not a coefficient is significant, a node is defined as a ZEROTREE ROOT if (1) the coefficient has an insignificant magnitude, (2) the node is not the descendant of a ZEROTREE ROOT, i.e., it is not completely predictable from a coarser scale, and (3) all of its descendants are insignificant. A ZEROTREE ROOT is encoded with a special symbol indicating that the insignificance of the coefficients at finer scales is completely predictable. To encode the binary significance map, three symbols are coded: ZEROTREES, ISOLATED ZEROS, and NON-ZEROS. In this zerotree system a static bit of coefficient indices is used and each coefficient is individually checked to determine whether (1) a symbol must be encoded or (2) it is completely predictable.

U.S. Pat. No. 5,412,741 to Shapiro ("Shapiro '741") discusses an improved zerotree system. In the Shapiro '741 system, for a given pass through the coefficients, a dominant list, used for storing coordinates of coefficients for coding, contains the coordinates of those coefficients for which one of the following two conditions apply: (1) the coefficient has not yet been found to be significant AND, a symbol will be generated on the CURRENT dominant pass, or (2) the coefficient has been previously found to be significant BUT one of its descendants satisfied condition (1).

The dominant list of Shapiro '741 excludes the coordinates of those coefficients which have not yet been found to be significant, but have ancestors that are zerotree roots. Given this condition, no symbol would be generated. However, under zerotree methods prior to Shapiro '741, this position would have to be checked to verify that some ancestor is a zerotree root. Shapiro '741 avoids wasting computation in checking the predictability of coefficients that are part of zerotrees, and thus predictably insignificant, by dynamically generating the dominant list during the dominant pass. The dominant pass is the part of iteration that discovers new significant coefficients with respect to the current threshold. At the beginning of a dominant pass, the dominant list contains the coordinates of all of the coefficients in the coarsest scale (lowest frequency) subband whether or not they have been previously found to be significant. As this list is scanned during a dominant pass, if a coefficient in the coarsest scale subband has not previously been found to be significant, then one of four symbols is encoded: (1) ISOLATED ZERO, (2) ZEROTREE ROOT, (3) POSITIVE SIGNIFICANT, (4) NEGATIVE SIGNIFICANT. Specifically, a ZEROTREE ROOT symbol is used when all of the descendants of the coefficient under consideration are either predictably insignificant, or have previously been found to be significant. In other words, a ZEROTREE ROOT implies that for all of the descendants, no symbol will be generated on the current dominant pass. In Shapiro '741, whenever a coefficient on the dominant list is not coded as a ZEROTREE ROOT, the dominant list for the current pass is appended to include the children of the current coefficient. Thus, the dominant list for the current pass will contain the coordinates of all coefficients that are not descendants of zerotrees, and thus Shapiro '741 states that the computational cost and compression time are improved.

While the system of Shapiro '741 offers computationally simple and efficient coding techniques, the time for encoding or decoding an image based on a wavelet transform can be further improved. One reason the speed of the system of Shapiro '741 can be improved is due to the Shapiro '741 system's use of arithmetic coding. The Shapiro '741 system is limited to an arithmetic coding due at least in part to very small size of the symbol set used to encode the coefficients. While Shapiro '741 specifies a certain symbol set based on certain rules for encoding coefficients, the Shapiro '741 symbol set limits efficient encoding to arithmetic coding. Another reason the Shapiro '741 system is more suited for arithmetic coding is that Shapiro '741 only calculates a single threshold for evaluation against one bit plane before proceeding to evaluate the threshold against another bit plane. The Shapiro '741 symbol set and methodology of traversing and encoding trees of coefficients is not efficiently encoded by Huffman coding techniques.

Another reason the Shapiro '741 system can be improved is due to the specific symbols that are used for encoding. The specific symbols used in Shapiro '741 is based on or dictated in part by the methodology used for encoding. The methodology of encoding in Shapiro '741 is based on predicting that descendant's of insignificant coefficients are insignificant. Thus, in the Shapiro '741 system and prior zerotree type systems a symbol is encoded to specify whether a coefficient is insignificant. Coding coefficients as insignificant using prior methodologies requires more storage and computational time than if these coefficients are not coded.

Thus, there is a need in art for a coding system that is computational fast and efficient and that is operative for use with Huffman coding. Additionally, there is a need in the art for a coding system that provides an efficient technique for coding coefficients without wasting computation time by coding insignificant coefficients.

SUMMARY OF THE INVENTION

Generally described, the present invention provides a system that efficiently encodes a wavelet transform using Huffman coding. The present invention provides a certain set of rules for encoding, represented by a symbol set, that enables Huffman coding to be efficiently used for coding a wavelet transform. Also, the present invention is operative to evaluate multiple bit planes against multiple threshold values.

More particularly, a method of the present invention codes a hierarchical subband system of coefficients of a wavelet transform that is representative of an image. The wavelet transform includes coefficients organized in frequency subbands representative of the decomposition of an image. Each of the subbands is representative of a different level of frequency detail of the image. The subbands have coefficients at a same orientation and at a same spatial location as other of the subbands. The coefficients are operable for association among the coefficients by a tree structure. The tree structure relates a coefficient of a subband of a coarser level of detail to coefficients of a subband of a finer level of detail. A coefficient in a coarser subband is defined as a parent and coefficients corresponding to the same spatial location at the next finer scale from the coarse scale of similar orientation are defined as children. The descendants of children are defined as grandchildren. The set of coefficients, at a finer scale than a coarser scale, of similar orientation correspond to the same spatial location within the subband being descendants. receiving said coefficients of said wavelet transform;

In one method of the present invention a plurality of thresholds ranges is selected. A first coefficient of the tree structure is compared against the plurality of threshold ranges during a first single traversal of the tree structure and a second coefficient of the tree structure against the plurality of threshold ranges during the first single traversal of the tree structure. The method of the present invention also determines whether the first or second coefficient satisfies a selected condition with respect to either of the threshold ranges. The difference in addresses between the addresses of the first and second coefficients is determined if the first and second coefficient satisfy the selected condition. The method of the present invention then codes the location of the second coefficient based on the address of the first coefficient using the difference.

The method of the present invention may further include the step of utilizing Huffman tables to code the address locations. Additionally, this method of the present invention may include selecting the plurality of threshold ranges comprises establishing an initial threshold value, T, from which the threshold ranges are selected. The step of selecting the plurality of threshold levels may include selecting a first threshold level for coefficients that have a magnitude that is between T and 2T and selecting a second threshold level for coefficients that have a magnitude that is between 2T and 4T.

Another method of the present invention includes providing addresses for a hierarchical subband system of coefficients of a wavelet transform that is representative of an image. The wavelet transform includes coefficients organized in a plurality of frequency subbands representative of the decomposition of an image. This method includes the steps of locating each coefficient in the array, providing a level parameter that indicates the subband level in which the coefficient is located, and providing a position parameter that associates the coefficient with a unique position of the coefficient within the level.

Another method of the present invention the coefficients of the tree are traversed in an ordered sequence. A first coefficient at a first address of the wavelet transform is compared to a threshold value and a second coefficient at a second address of the wavelet transform to the threshold value. The method determines whether the first and second coefficient satisfies a selected condition with respect to the threshold. The location difference in addresses between the addresses of the first and second coefficients are determined if the first and second coefficient satisfy the selected condition. The location of the second coefficient is coded based on the address of the first coefficient using the difference.

This method may include the step of assigning two parameters to each of the coefficients. The two parameters collectively identify the address of a particular coefficient. One parameter of the two is a level parameter that indicates the level in which the coefficient is located in the hierarchical subband. The other parameter is a position parameter that indicates a position of the coefficient within the level. This method may additionally include an ordered set of symbols that are assigned to each association between a parent coefficient and a child coefficient and the set of symbols are operable to be used to calculate the position parameter of the child coefficient. Preferably, each parent coefficient has only four children coefficients associated therewith and the associations are labeled with the ordered sequence 0, 1, 2, and 3, respectively.

Additionally, the method of the present invention may include examining a plurality of the trees of coefficients and coding coefficients in selected ones of the trees. This method may also include determining which of the trees have at least one coefficient that satisfies the first condition and designating the coefficients of the trees that satisfy the first condition to be encoded.

BRIEF DESCRIPTION OF THE DRAWINGS

The accompanying drawings illustrate preferred and alternative embodiments of the present invention and, together with the general description given above and the detailed description of the embodiments given below, serve to explain the principles of the present invention.

FIGS. 5a and 5b is a diagram of the tree traversal process used in connection with the present invention.

FIG. 6 is a diagram of a symbol set of the present invention used for coding a wavelet transform.

DETAILED DESCRIPTION OF THE INVENTION

Figures 1, 2A:
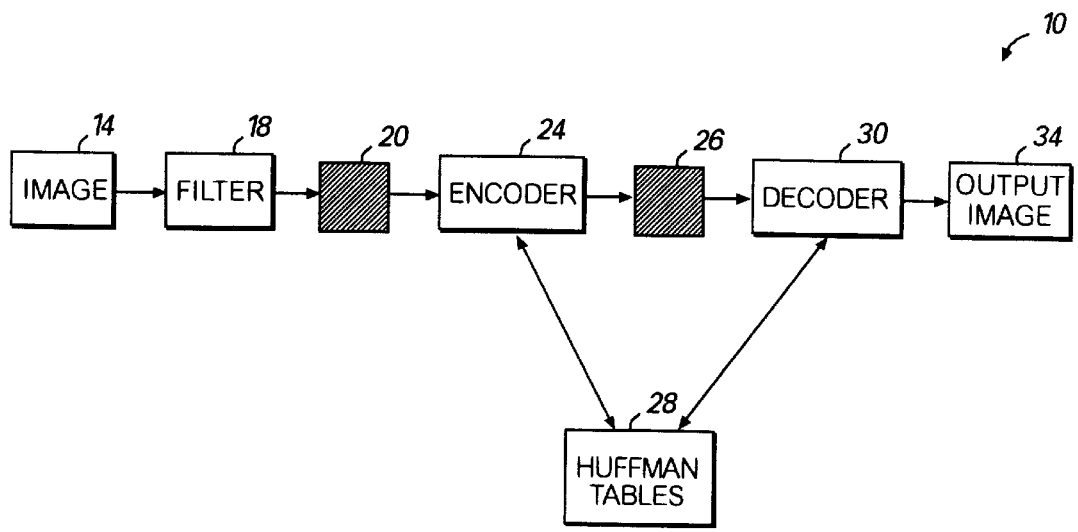
FIG. 1 is a general block diagram of a system of the present invention.
FIG. 2a is a diagram of a wavelet transform used in connection with the present invention.

Referring to the figures, various embodiments of the present invention are described. Referring to FIG. 1, the coding system 10 operating according to the present invention is shown. The coding system 10 encodes a wavelet transform using a depth-first bit plane traversal. Depth-first bit plane traversal refers to evaluating all ancestors or descendants of a coefficient before evaluating the siblings of the coefficient. In previous zerotree coding methods, the order of traversal of a tree is "breadth first"; that is, sibling coefficients being evaluated before descendant coefficients. Unlike some conventional image coding for a wavelet transform, the present invention provides a simple methodology that uses Huffman coding techniques for encoding the wavelet transform. Additionally, in prior zerotree coding methods, these systems coded certain insignificant coefficients and predicted that certain other coefficients were insignificant from the encoded insignificant coefficients. However, the system of the present invention utilizes a different methodology that bases coding from coefficient to coefficient on coefficients that are significant. The system of the present invention exploits the property of a hierarchical decomposition which clusters or positions coefficients have higher numerical value in relatively close proximity to each other. More specifically, an embodiment of the present invention implements a coding process that specifies the positions of significant coefficients. This embodiment expresses the positions of these coefficients as a different from a proceeding significant coefficient. This embodiment also labels or specifies the coefficient positions by identifying the positions in a certain manner. The present invention advantageously provides an encoding and decoding process that performs quickly and reliably and in many cases performs faster than prior methods applied to wavelet transforms.

The coding system 10 traverses "trees" of a wavelet transform in a depth-first order and evaluates multiple bit planes during a single iteration. An iteration is generally defined as one of a plurality of repeated loops through an evaluation sequence of the coefficients of a wavelet transform or data structure. In order not to unnecessarily encode elements of a plane when multiple planes are being scanned, the present invention utilizes a prediction mechanism to determine whether only one or a portion of the multiple planes should be encoded.

As known to those skilled in the art, Huffman tables used for coding are organized in a manner that reflects the probability of a certain element occurring in a given data set. Consequently, each Huffman table used in accordance with the present invention is constructed and based on the probability of an element occurring in view of the location of a coefficient in an array of coefficients. Those skilled in the art may select Huffman table data based on the particular coding or data set involved.

An image 14 is decomposed using a standard sampling filter 18. The filter decomposes the image into four frequency subbands. The output of the filter 18 is termed a wavelet transform 20. The wavelet transform 20 is processed by the encoder 24 to generate a compressed image 26. The encoder 24 efficiently generates the compressed image 26 using Huffman tables 28. Prior low bit rate image coding systems which use zerotree prediction are not generally operative to Huffman encode more efficiently than when using arithmetic encoding. The compressed image 26 may be decompressed using the decoder 30. The decoder 30 likewise utilizes Huffman tables 28 to produce the output image 34. Thus, by utilizing the type symbol set defined herein and by utilizing Huffman tables, the present invention is operative to provide a fast and reliable image encoding system 10.

Referring to FIG. 2a, an example wavelet hierarchical subband decomposition (wavelet transform) is illustrated with selected coefficient values shown. The image is decomposed using times two sub sampling to produce four frequency subbands. The four frequency subbands are: high horizontal-high vertical (HH), high horizontal-low vertical (HL), low horizontal-high vertical (LH), and low horizontal-low vertical (LL). The subbands are further subsampled times two in a recursive process, as known by those skilled in the art, to produce a set of subbands that have coefficients as shown in the array (wavelet transform) in FIG. 2a. The array of FIG. 2a has subbands labeled LL3, LH3, HL3, HH3, LH2, HH2, HL2, LH1, HH1, and HL1. This discrete wavelet transform illustrates three subsamplings. However, it should be appreciated that more subsamples (e.g. 4 to 6) may be used in practice. The subband levels 38 are labeled 0, 1, 2 and 3 along the horizontal and vertical axis. The top left subband, LL3 is the lowest frequency subband of FIG. 2a and the bottom right frequency subband, HH1, is the highest frequency subband. The relationship of coefficients in the wavelet transform 20 are generally represented by trees and described in terms of parent-child relationships as generally discussed above. In a wavelet transform, the magnitude of wavelet numbers or coefficients become smaller as the distance from the root of the tree increases.

The total number of coefficients in lowest frequency subbands HL, LH and HH determine how many trees are to be evaluated. The depth of the tree is determined by the number of coefficient levels as defined in a "tree". Because each of the lowest frequency subbands, HL3, HH3 and LH3 each have 4 coefficient values, twelve trees result from the example of FIG. 2a. As noted above, levels are also referred to as subbands. Values in the high frequency range generally indicate that finer detail is in that level, such as when color varies rapidly within an image. Low frequency, on the other hand, indicates that color varies slowly and the detail is coarser. The transform filter maps the lower frequency components of the image to the upper left hand portion of the wavelet transform array.

Figure 2B:
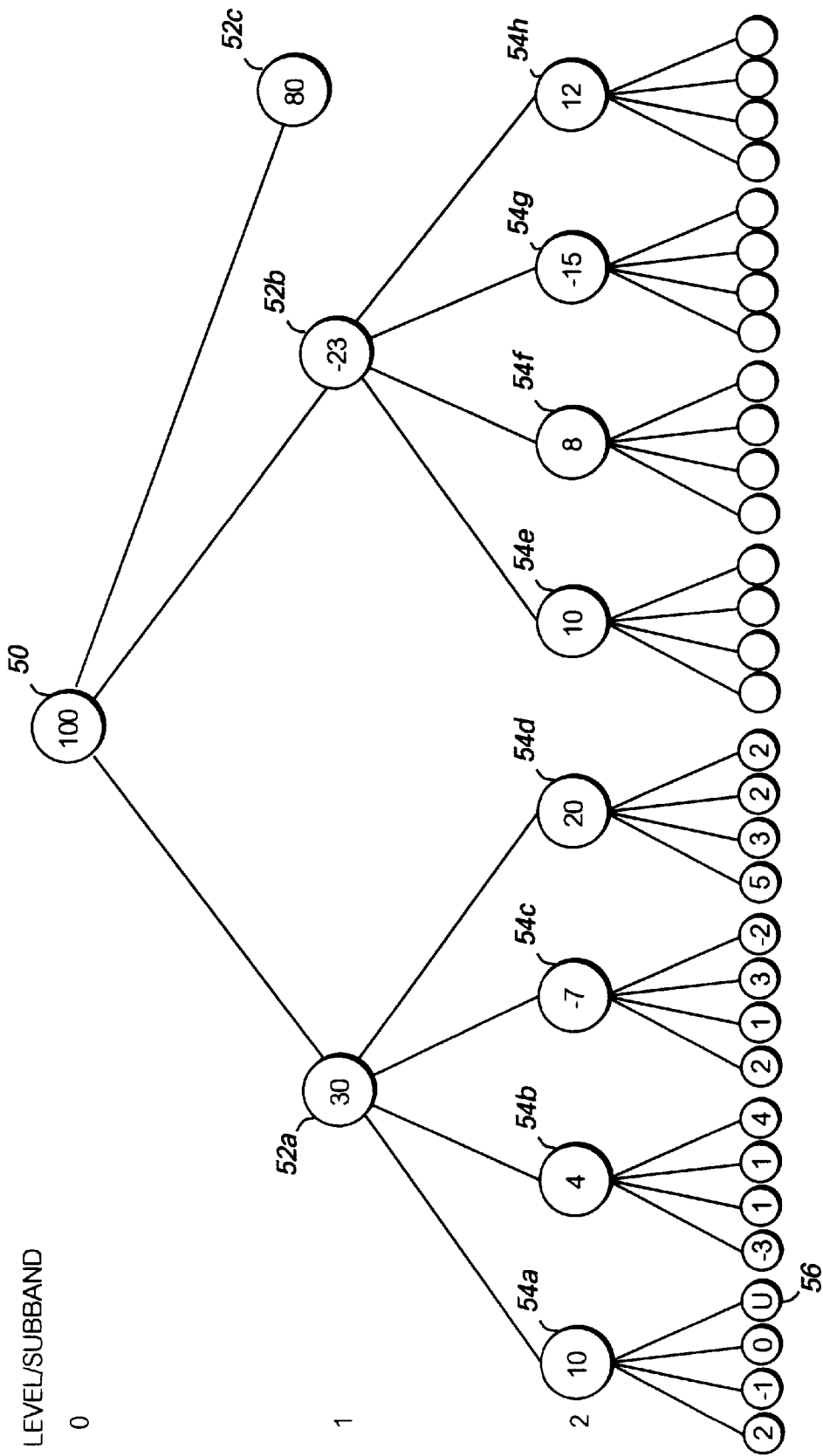
FIG. 2b is a diagram of a tree structure used in connection with the present invention.

Referring to FIGS. 2a and 2b, the manner in which trees are constructed or viewed in a wavelet transform is illustrated. The parent-child relationship for four generations of a subsampled image is illustrated. The four generations are subbands/levels 0, 1, 2, and 3. A single parent node 50 of the LL3 subband has 3 child nodes, 52a, 52b, and 52c. Generally each node has four children or offspring except for the LL band. For example, each child node 52 has four child nodes. Particularly, the child node 52a has four child nodes, 54a, 54b, 54c, and 54d. Similarly, the child node 52b has four child nodes, 54e, 54f, 54g, and 54h. Each of the child nodes 54 has child nodes 56i. The children of a particular coefficient of a subband are located in the same relative position (FIG. 2a) in the children's subband as the coefficient being considered. For example, the child node 52a has a coefficient value "30" and is located in the HL3 subband. The children of a child node 52a are located in the upper left hand corner of the HL2 subband and have the values "10", "4", "–7", and "20". Similarly, the child node 54d has a coefficient value of "20" and the children of the coefficient "20" are in the HL1 subband in the same relative position. The children of the child node 54d are "5", "3", "2", and "2". The same type parent-child relationship is utilized throughout the wavelet transform 20. Descendants are considered to be children and their children and so forth. Grandchildren are considered to be all descendants excluding children. "Ancestors" have the reverse or opposite lineal relationship to other nodes or coefficients as compared with descendants.

Figure 3:
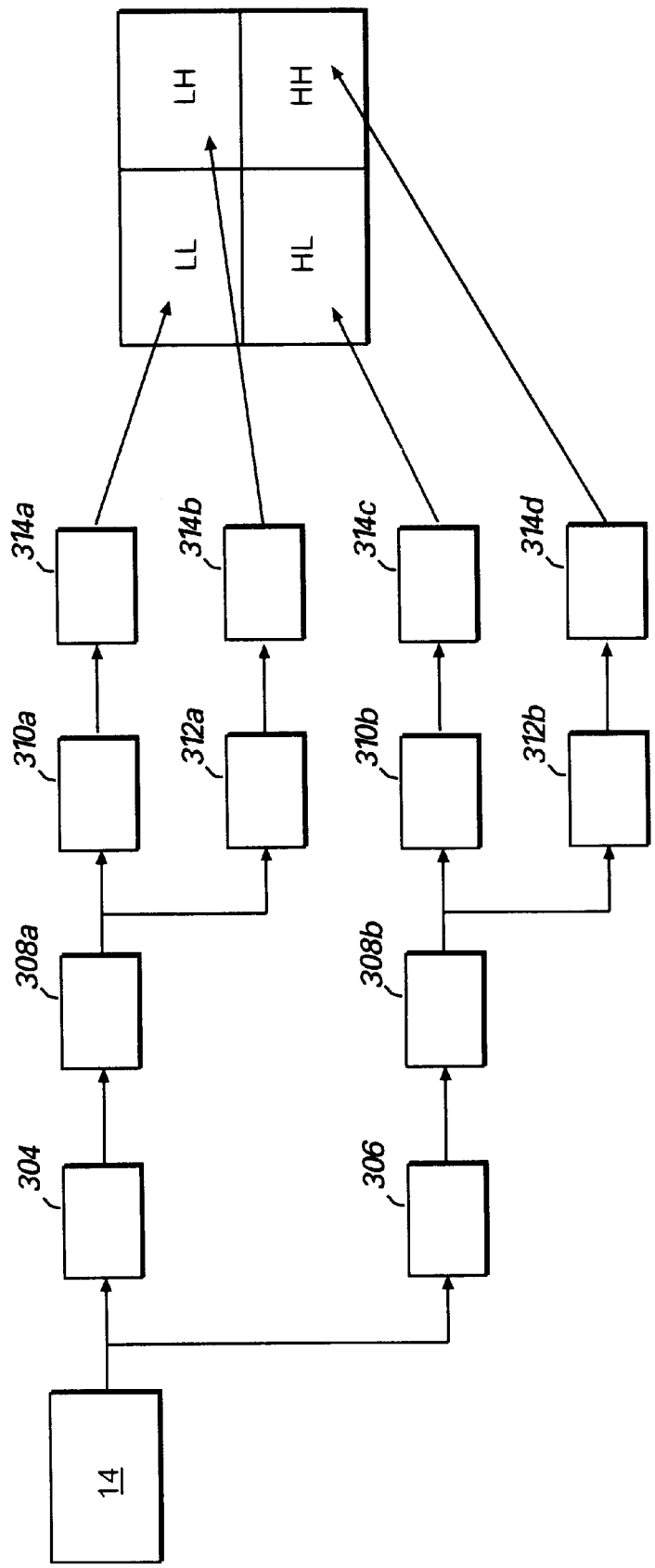
FIG. 3 is a diagram of a filter that may be used to generate a wavelet transform.

In the present invention, the roots of the trees are coefficients in the lowest frequency subbands HL, LH and HH. Referring to FIG. 3, a filter used in constructing a wavelet transform 20 is shown. The input image 14 is filtered by a horizontal low pass filter 304 and a horizontal high pass filter 306. The outputs of the horizontal low pass filter 304 and horizontal high pass filter 306 are horizontally subsampled times two by the two horizontal subsampling filters 308a and 309b. The horizontal low pass output signal from the horizontal low pass filter 304 and the horizontal high pass filter 306 are vertically low pass and high pass filter by the low pass filters 310a and 310b and high pass filters 312a and 312b. The outputs are vertically subsampled times two by vertical subsampling filters 314a, 314b, 314c, and 314d. Subband components LL, LH, HL and HH are output by the filters as shown. These outputs are stored in an array 320 as shown. The filters associated with the filter 18 are preferably digital quadrature mirror filters (QMF) for splitting the horizontal and vertical frequency band into low frequency and high frequency bands. Additional subbands are produced by repeatedly performing a one-scale subband decomposition on the LL subband. QMF filters at each decomposition level are similar to one another. These type filters are well known in the art. The filter 18 performs its decomposition operation to produce the wavelet transform 20 by processes implemented in a computer system. Additionally, the encoding and decoding processes of the present invention are implemented in a computer system.

Figure 4:
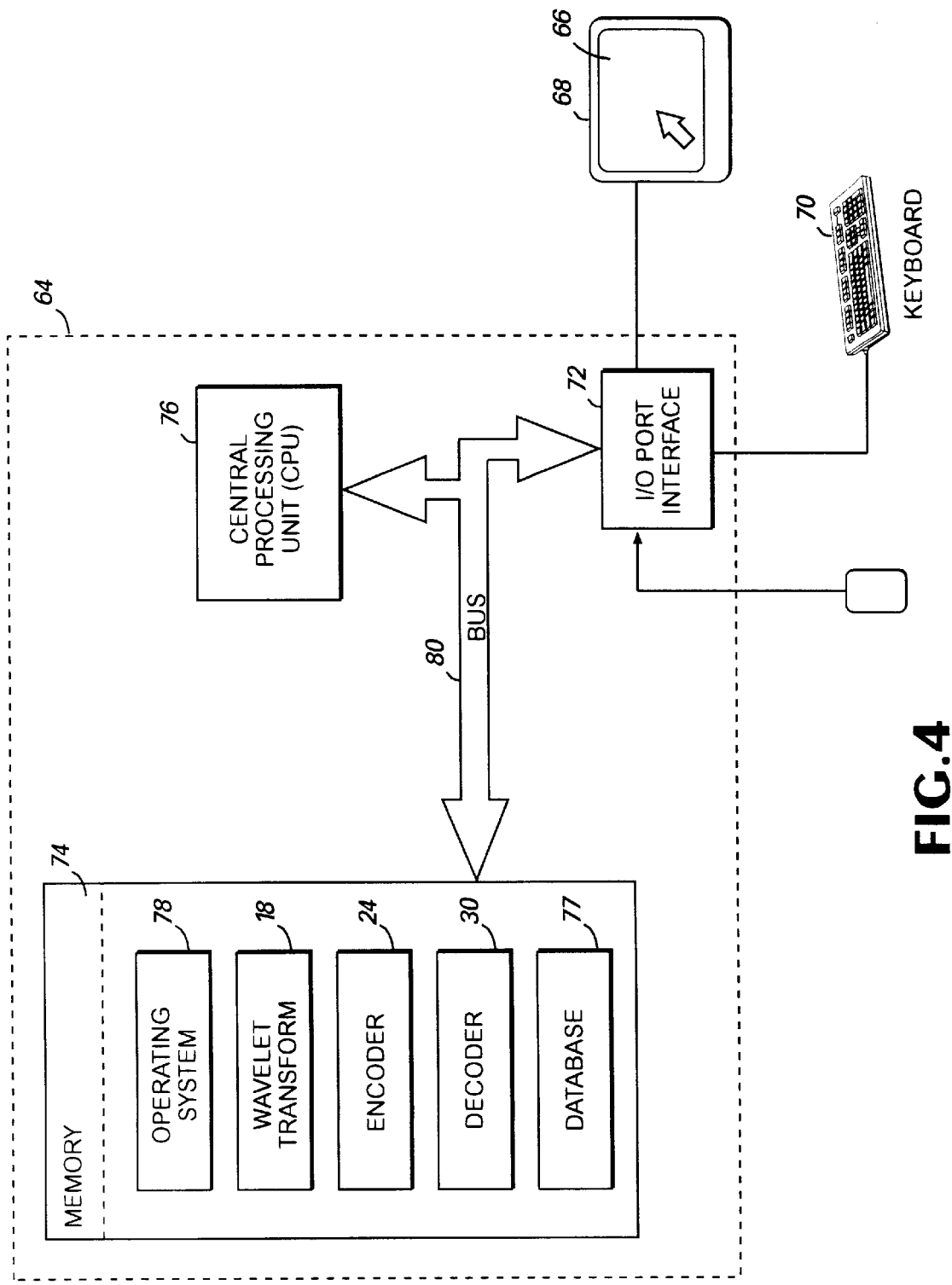
FIG. 4 is a diagram of a computer used in connection with the present invention.

Referring to FIG. 4, a computer system 64 that may be used in connection with the present invention is illustrated. The computer system 64 includes a graphical user interface 66 that may display an image on a display monitor 68. The graphical user interface 66 is implemented in conjunction with the operating system to display and manage the information of computer applications and the operating system. The graphical user interface 68 is implemented as part of the computer system 64 to receive input systems from a conventional keyboard 70 or from a mouse or other input device via an input/output interface 72. These input devices enable a user to select options that may include specifying the decomposition of an image, the encoding of an image, the decoding of an image, or any other process implemented in the present invention.

For simplicity of the drawings, many components of a standard computer system have not been illustrated, such as address buffers, memory buffers and other control circuits because these elements are well known and illustrated in the prior art and are not necessary for an understanding of the present invention. The computer programs used to implement the various steps or processes of the present invention are generally located in the memory unit 74 and the processes of the present invention are carried out using a central processing unit 76. Those skilled in the art will appreciate that the memory unit 74 is representative of read-only and random access memory. The memory unit also contains a database 77 that stores data and tables that may be used in conjunction with the present invention. A computer system suitable for use with the present invention may contain 16 MB of RAM, a 240 MB hard drive and 486 microprocessor manufactured by Intel Corporation of Santa Clara, Calif.

With continuing reference to FIG. 4, the CPU 76 is typically implemented as a single-chip microprocessor. The CPU 76, in combination with computer software, such as an operating system 78, the wavelet transform filter 18, the encoder 24, and the decoder 30, control certain operations of the computer system 64. The operating system 78, in conjunction with application programs, control the allocation and usage of hardware and software resources such as memory, CPU time, disk space, printer and peripheral devices, such as the display monitor 68. The present invention includes a bus 80 of the computer system that supports communications, control, address, and data signals between the CPU 76 and the remaining components of the computer system 64. It should be appreciated that different types of buses are used in a computer system and that the bus 80 generally represents the various types. The memory unit 64 and the central processing unit 76 are connected by the bus 80 which is designed to provide an electrical interface between computer system components. The processes implemented by the central processing unit 76 may be communicated as electrical signals along the bus 80 to an input/output device. The computer system 64 has an input/output port 72 that may be used to receive data from outside sources. For example, an image may be transmitted from another device or peripheral through the input/output port 72 for processing in accordance with the present invention.

In this detailed description, numerous details are provided such as computer system elements, formats, sample data, etc., in order to provide an understanding of the present invention. However, those skilled in the art will understand that the present invention may be practiced without the specific details. As generally discussed herein, a method or process within a computer system is generally a sequence of computer-executed steps leading to a desired result. It should be understood that the programs, processes, objects, etc., described herein are not related or limited to any particular computer or apparatus. Rather, various types of machines may be used with programs operating in accordance with the teachings herein.

Wavelet Tree Traversal

As noted above, the present invention utilizes a depth-first iterative bit plane encoding process. The system of the present invention may operate with a discrete wavelet transform (DWT) for an N pixel by M pixel image that has been computed and stored in a one dimensional (1-D) buffer of length N×M. Because the wavelet transform is a hierarchical subband decomposition, the wavelet coefficients are associated by "trees" in the same subband across different scales or depths, as discussed above. Thus, at the first scale in subbands HL, LH and HH, there are a "forest" of coefficient trees whose "roots" lie within the first scale and whose "branches" go across the higher resolutions. The sequence of symbols generated during the coding process are uniquely decodable since the trees are scanned in HL, LH, and HH subband order and in an a priori fixed manner. An example depth-first scanning order is illustrated in FIG. 5.

Referring to FIG. 5a, a sample depth-first scanning order is illustrated. Referring to the wavelet transform 90, the diagram shows that the roots in the first scale in subband HL are scanned in row-major form as indicated by the arrows 92. Also the diagram indicates that the roots in the first scale in subband LH are scanned in column-major form as indicated by the arrows 94. Also the diagram shows that the roots in the first scale in subband HH are scanned in row-major form as indicated by the arrows 96. The LL subband coefficients are considered to be roots. These LL subband coefficients are initially considered significant with subsequent iterations providing successive approximation as with the high frequency subband coefficients. FIG. 5a also illustrates by the numbers 1, 2 and 3, that the HL frequency components are scanned first, followed by the LH frequency components, followed by the HH frequency components. FIG. 5b illustrates the scanning order of children within the wavelet transform 20 in a depth-first manner. The order traversed is referred to as depth first traversal because the descendants of a coefficient are scanned or evaluated before the siblings of the coefficient are scanned or evaluated. The numbers inside the circles of the tree indicate the order in which coefficients are traversed in a depth-first manner. As represented by the numbers 3, 4, 5 and 6, the children of the coefficient 54a, are scanned before the sibling coefficient 54b of 54a. This order or manner of traversal is implemented on the multiple trees of the wavelet transform.

Tree Encoding/Decoding Symbols

As noted above, the present invention evaluates two bit "planes" or two thresholds during a single iteration. In conventional systems, the coefficients of a tree are evaluated against a single threshold during a single iteration. However, in the present invention, during a single iteration, the process evaluates the coefficients against multiple levels of thresholds ranges ("planes"). Conventional coding systems indicate whether a coefficient is insignificant or significant with respect to some threshold. In conventional coding systems, significance generally indicates that the coefficient is greater than the threshold and insignificance indicates that the coefficient is less than the threshold. However, the present invention differs in one respect from conventional systems in that an embodiment of the present invention defines at least two types of significance variables that correspond to two significance thresholds levels or ranges for coding the coefficients of a tree. The two significance symbols used in the present invention are "S1" and "S2" where S1 significance is preferably greater than S2 significance. Therefore, the set of significance symbols is [S1, S2]. An advantage of evaluating two planes or multiple threshold levels in a single iteration in the system of the present invention is that the number of iterations required to encode or decode a set of coefficients is reduced.

Referring to FIG. 6, a significance symbol table 600 specifies the conditions upon which a coefficient is labeled significant. The significance symbols 602 are S1 and S2. The condition 604 specifies the conditions upon which a coefficient is encoded with the significance symbols 602. Particularly, a coefficient is labeled S1 significant if the magnitude of the coefficient "x" is between 2T and 4T. If the magnitude of the coefficient x is between T and 2T, the coefficient is labeled S2 significant. Thus, the symbol set of the present invention utilizes at least two symbols to indicate the relative significance of coefficients of a tree during an iteration.

Thresholds and Bit Planes

Figures 7A, 7B:
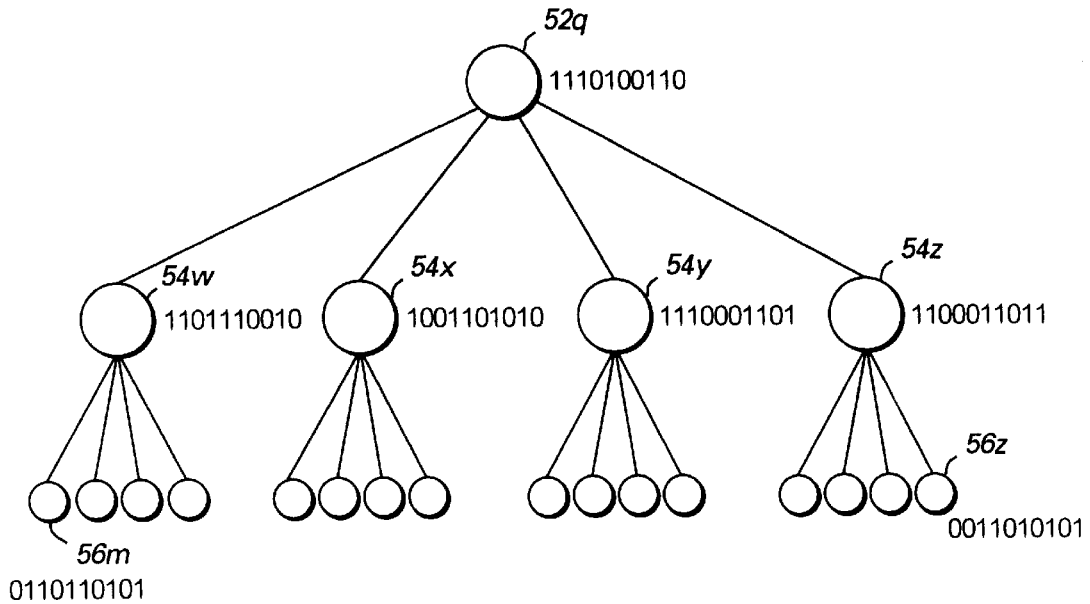
FIG. 7a is a diagram of a tree structure used in connection with the present invention that has the coefficients expressed in binary numbers.
FIGS. 7b and 7c show the relationship of bit planes and threshold values and the processes of evaluation of the bit planes during iterations of analyzing the tree structure.

Referring to FIG. 7a, a tree structure representing the coefficients of a wavelet transform is illustrated. The coefficients are illustrated in their binary form. For example, the value of the coefficient 52q is represented by the binary sequence 1110100110 and the value of the coefficient 54w is represented by the binary sequence 1101110010. By representing the coefficient values in their binary form, a bit plane analysis of the coefficients can be performed. Referring to FIG. 7b, the coefficients 54q and 54w are shown as evaluated in a first iteration. Each binary value of a coefficient may be generally termed a "k" bit. These values are said to be in a kth plane depending on the location of the binary value in the binary representation. The k bits are ordered from 0–9 as illustrated. Thus, the k bits represent bit planes for the binary representations.

In FIG. 7b, nine bit planes are shown for the coefficients 54q and 54w. For the coefficient 52q, the values in the 9th, 8th, 7th, 6th, and 5th bit planes are 1, 1, 1, 0, and 1, respectively. The corresponding threshold values are related by the function $T=2^k$. Thus, the threshold value representation for the 9th bit plane is 512 and the threshold representation for the 2nd bit plane is 4. FIG. 7b also indicates that two bit planes, the 8th and 9th, are evaluated during a single iteration by the label MSB which represents a most significant bit pass. In the MSB pass, a list of indices of significant coefficients is constructed. After the MSB pass a least significant bit pass (LSB) is performed on the bit plane that follows the two evaluated bit planes, which in this case is the 7th bit plane. The LSB pass provides an indication of how the bits are to be evaluated on subsequent iterations. A most significant bit pass and least significant bit pass is performed for each iteration. In a second iteration of the system of the present invention, the 6th and 7th bit planes of coefficients would be evaluated in the most significant bit pass and the 5th bit plane would be evaluated in the least significant bit pass.

Figures 7C, 8:
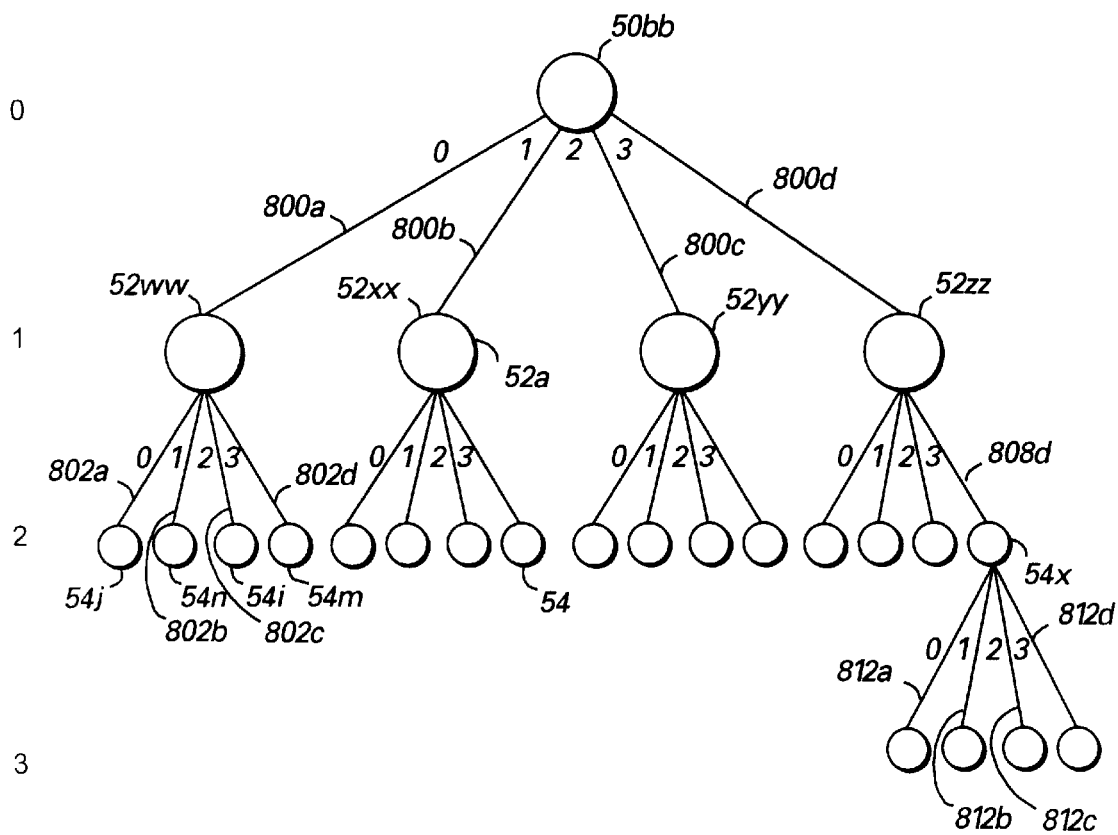
FIG. 8 is a diagram of coefficients that has symbols associated with each parent-child relationship according to an embodiment of the present invention.

Referring to FIG. 7c, the table 700 shows the manner in which S1 and S2 significance can be evaluated with respect to threshold values and to k planes. For example, S2 significance is determined by the equation: T<x<2T. An efficient evaluation of significance can be made by analysis of whether a bit is a 1 or 0 in a specified plane. For example, S2 significance is also indicated if the k+1 th bit=0 and kth bit=1. Similarly, S1 significance is determined by the following 2T<x<4T. S1 significance is indicated if the k+1 th bit=1.

Symbols Designated for Assignment Between Parent-Child Nodes

Referring to FIG. 8, a set of coefficients are shown associated by their parent-child relationship. The coefficients of FIG. 8 represent a portion of a hierarchical subband decomposition of selected coefficients. As generally noted above, each path between a parent and child is designated with a specific symbol or number. The numbers or symbols used to define a path between a parent and child are used to calculate the position of a specific coefficient in a tree as discussed in more detail below. As illustrated, the path 800a that associates the parent node 50bb with the child node 52ww is labeled 0. The path 800b from the parent node 50bb to the child node 52xx is labeled 1. The path 800c and the path 800d from the parent node 50bb to the children nodes 52yy and 52zz, respectively, are labeled 2 and 3 respectively. Thus, the paths or associations of children nodes from a parent node are preferably labeled with an ordered sequence of numbers such as the numbers 0, 1, 2, and 3. The numbering convention used to label the paths 800 between the parent node 50bb and the children nodes 52 is used to label the parent-child relationships existing between all levels within the hierarchical subband decomposition or tree. For example, the paths 802a, 802b, 802c and 802d, from the parent node 52ww to the children nodes 54j, 54k, 54l, and 54m are represented by or labeled with the numbers 0, 1, 2, and 3 respectively. Similarly, the paths 812 extending between the node 54x and the children nodes 56 are labeled 0, 1, 2, and 3 as discussed above. Thus, for each parent node, the paths to the four children are labeled with the four numbers 0, 1, 2, and 3. The labeling of the paths in this manner enables a calculation of the positions of particular coefficients within a particular level to be calculated or determined as a base four number.

Figure 9:
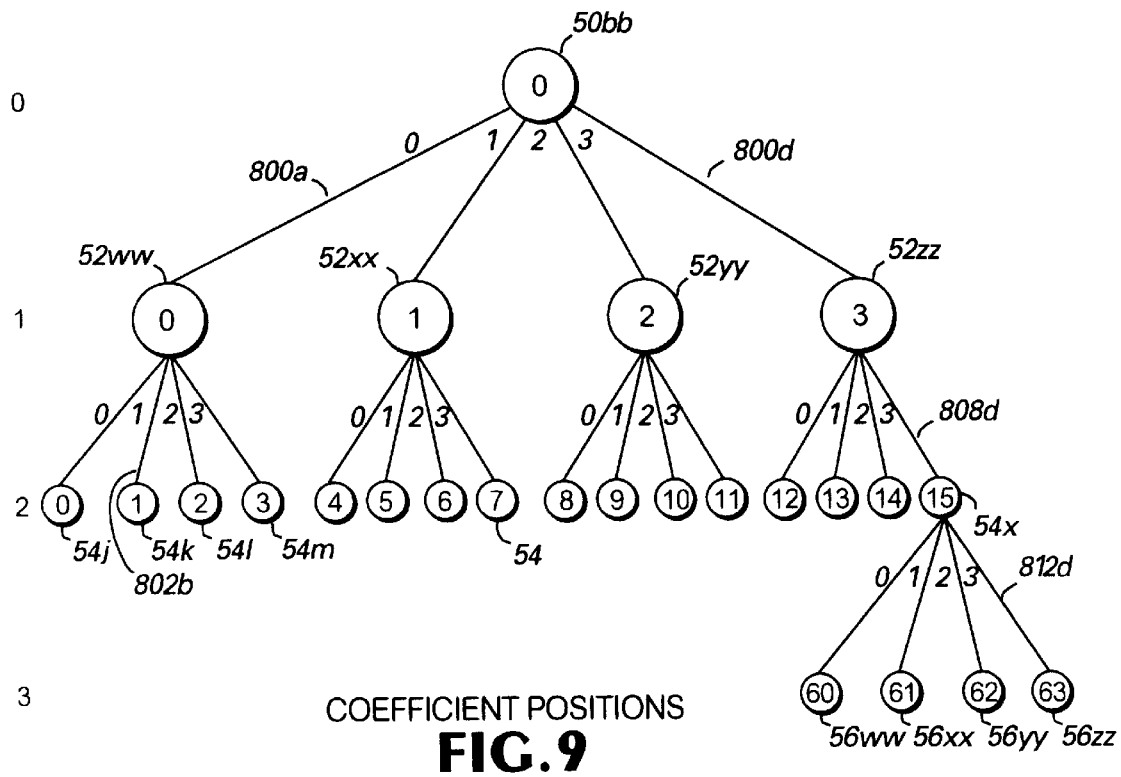
FIG. 9 is a diagram that illustrates position numbers that assigned to coefficients according to an embodiment of the present invention.

Referring to FIG. 9, the positions of coefficients within a particular level or subband as labeled according to an embodiment of the present invention is shown. The position numbers of the coefficients within a particular level are shown encompassed within the circle representing the coefficients illustrated. For example, the four coefficients 52ww, 52xx, 52yy, and 52zz of level 1 have positions 0, 1, 2, and 3, respectively, within the level. Similarly, the sixteen coefficients of level 2 are ordered sequentially beginning with 0 and ending with 15. For example, 54j, 54k, 54l, 54m, 54n, 54o, 54p, and 54q, have positions 0, 1, 2, 3, 4, 5, 6 and 7, respectively. Although only four coefficients are illustrated, level 3 has 64 coefficients labeled 0 through 63. Thus, the total number of coefficients within a particular level of a tree is $4^{level\ number}$.

As noted above, the position of a particular coefficient within a particular subband can be determined by interpreting the labels/symbols defined or associated with each parent-child relationship leading to the coefficient being evaluated. For example, the paths 800a and 802b from the parent node 50bb to the node 54k have labels 0 and 1, respectively. These labels express as a base four number is $(0\ 1)_4$. The interpretation of this base four number is $(0 \times 4)+1$ the position 1 of the node 54k. Similarly, the positions of all nodes within the tree can be determined by evaluating the paths as a base four. The position of the node 56zz can be determined by evaluating the labels of the paths, 800d, 808d, and 812d, between the node 50bb and 56zz as base 4 numbers. For example, the base 4 representation of the paths leading to the node 52zz is $((3\ 3)_4\ 3)_4$. The evaluation of the paths from the coefficient 50bb to the coefficient 56zz may be calculated as follows:

$$((3\ 3)_4\ 3)_4 =$$

$$((4 \times 3+3)\ 3)_4 =$$

$$(15\ 3)_4 =$$

$$(15 \times 4+3) =$$

$$60+3 =$$

$$63$$

Thus, determining the position of a coefficient may be calculated by evaluating the labels defined to the paths leading to the coefficients. A program module using recursive functions can be used to determine the addresses based on the labels as known by those skilled in the art.

Figure 10:
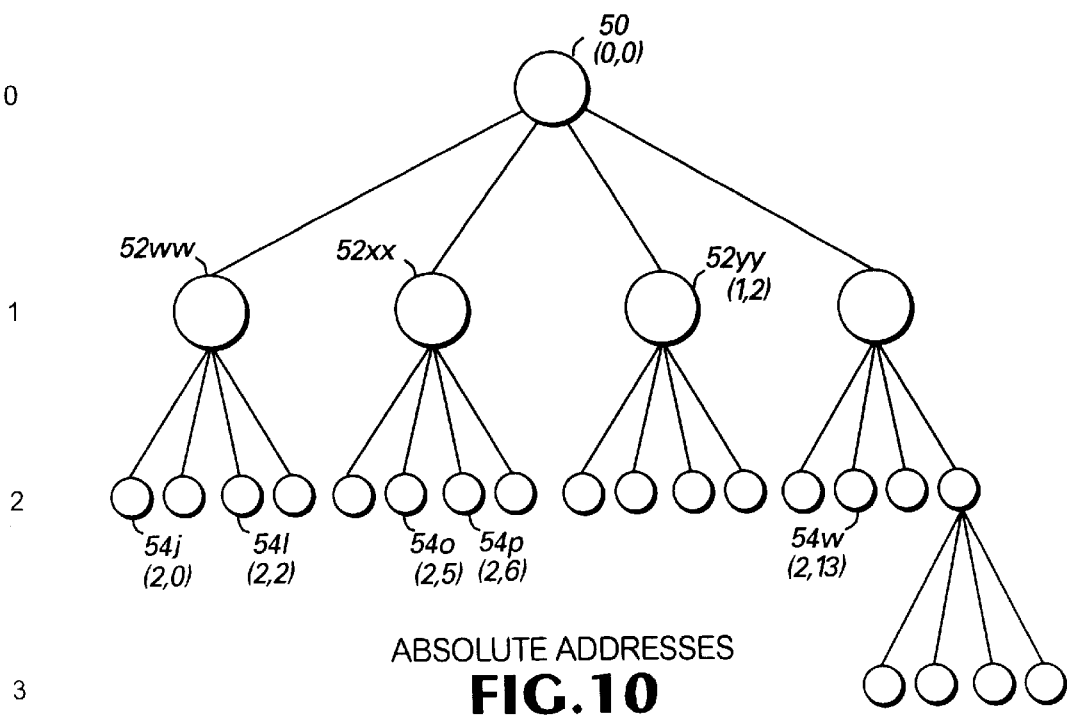
FIG. 10 is a diagram that shows selection ordered addresses assigned to certain coefficients and also indicates that some coefficients are significant.

Referring to FIG. 10, a tree is shown with selected coefficients indicated as significant. The significant coefficients are indicated by the solid shaded coefficients of the tree. The coefficients 52xx, 52yy, 54j, 54l, 54o, and 54p, are the significant coefficients labeled in this tree. Each of the significant coefficients are identified with the corresponding address. The first address, as used with this embodiment of present invention, is a priori fixed and the other addresses can be determined from the first address. The first address in the diagram is a prior fixed as (0,0). The address of a particular coefficient is given by the "level" of the coefficient and the "position" of the coefficient within the tree (level, position). For example, the address of the coefficient 52xx is (1, 1). The address of the coefficient 52yy is (1, 2). Similarly, the addresses of the coefficients within level 2 are determined by the same process. For example, the coefficients 52j, 54l, 54o, and 54p have addresses (2, 0), (2, 2), (2, 5), and (2, 6), respectively.

As noted above, the system of the present invention encodes the locations of coefficients by identifying significant coefficients and then determining the difference in position of successive significant coefficients as located during a depth-first traversal of the tree.

In determining or locating addresses of coefficients, the system of the present invention preferably uses delta pulse code modulation (DPCM) on the addresses. Using DPCM, the system of the present invention sends the first address of a set of addresses, and then for each subsequent address that has relevant data, the difference from the previous address is calculated and used for encoding in the present invention. By using a difference calculation to specify the address of a significant coefficient, less data or fewer bits are generally required to specify an address or encode data. For general example, suppose coefficients start with an initial address 0, and significant coefficients are identified at the following addresses (4, 8, 9, 9, 10, 6, 0, 1). While these addresses may be transmitted as identifying significant coefficients in the system of the present invention, the system of the present invention improves encoding by sending the differences between these addresses. The differences between these addresses are typically smaller than the address values themselves. If the differences between addresses are larger than the address values themselves, a significant improvement may not be attained as compared to sending the addresses themselves. However, in a hierarchical subband decomposition, significant coefficients tend to cluster or be located relatively near each other in the array of ordered coefficients. Because these significant coefficients are located generally near each other, the system of the present invention operates to exploit this property by encoding the differences between addresses rather than the addresses themselves. With respect to the sequence of sample addresses, specified above, the differences between these addresses are (4, 4, 1, 0, 1, −4, −6, 1). As can be seen, the differences between these addresses are less than the address values themselves. Therefore, encoding of the differences between addresses when the addresses of the relevant values are located near each other, results in improved performance for the system.

Figures 11, 12:
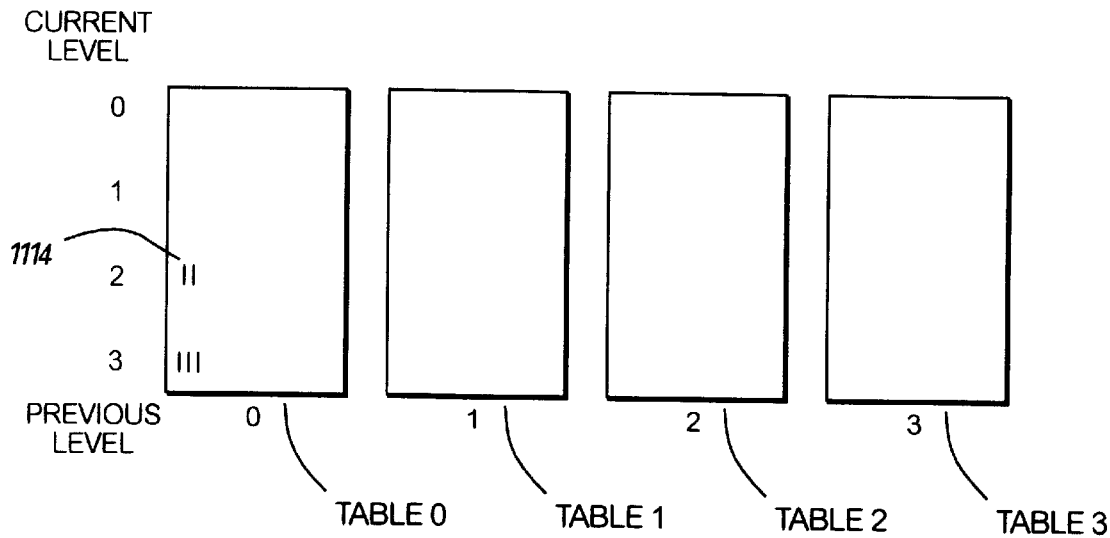
FIG. 11 is a diagram that illustrates Huffman tables used in accordance with an embodiment of present invention and the designations that are used for selection of the tables and codes within the tables.
FIG. 12 is a table that illustrates the differential addresses as determined according to an embodiment of the present invention for certain coefficients identified in FIG. 10.

Referring to FIGS. 10, 11, and 12, the manner in which differential addresses are determined according to an embodiment of a present invention is described. As used in the present invention, addresses are specified with two variables. Consequently, the differences between each of these variables are taken into account when providing a specification of the differences in location between significant coefficients. The two variables that specify an address are the level and position number of the coefficient. Consequently, as shown in the table of FIG. 12, the differential addresses are given by a table number 1212 and a position difference number 1218. The table number 1212 takes into account the differences, if any, between levels of the identified coefficient. Four Huffman tables are identified in FIG. 11: table 0, table 1, table 2, and table 3. Along the horizontal axis of the tables are numbers that identify the previous level identified for a significant coefficient. The four levels are specified as 0, 1, 2, and 3. Along the vertical axis of the Huffman tables, four numbers are provided to enable selection of the level for the current coefficient that is determined to be significant. Upon selection of the previous level for the significant coefficient which identifies a table and the selection of the current level of the significant coefficient, a code or symbol is transmitted for the coefficient from the corresponding location in the table. In addition to transmitting a symbol for the current coefficient, the method of the present invention determines a position number for the coefficient. Each of these variables are used to specify the difference for identifying the location of a current significant coefficient from a previous significant coefficient.

The difference calculation for significant coefficient in the present invention is as follows. When traversing the tree and a significant coefficient is encountered, the address of the coefficient is coded. In FIG. 10, using a depth first traversal as discussed in connection with FIG. 5, the first significant coefficient encountered is the coefficient 54j at address (2, 0). Upon encountering the significant coefficient 54j, the encoder of the present invention determines a difference from the starting point. In this case, the starting point was the address (0,0). First, the process accesses the Huffman tables and selects the table 0 of FIG. 11 because the previous level of the prior coefficient was 0. After selecting the table 0, the system of the present invention determines that the current level for the significant coefficient 54j is two. Therefore, the system of the present invention transmits the code 1114 from table 0 that is identified when the current level is two. After transmitting the level information with respect to the identified coefficient, the process then takes the difference with respect to the previous position. In this case, the positions associated with each coefficient are located in different levels. Therefore, the position calculation must take into account the different levels for calculating the position difference. The system of the present invention accounts for this position calculation by fixing the position from which the difference is to be calculated to be in the same level as the significant coefficient. There are two cases when the level positions are different: (1) when the level of the current coefficient being evaluated has a smaller level number associated with the current coefficient than the coefficient evaluated and (2) when the level of the current coefficient being evaluated has a larger level number associated with the current coefficient than the previous coefficient evaluated.

The first significant value is 54j at address (2, 0). Because the level of the current coefficient 54j being evaluated is greater than the level of the previous coefficient, the previous position used for determining the difference is the position of the lowest position number of the descendent of the previous cost that is in the same level as X and that has the same parent. In this case the position from which the difference is to be calculated is the position (2, 0) which is the same position as the coefficient 54j. Therefore, the difference is (0-0) yielding "0" as the difference value for encoding. Referring to FIG. 12, table 1200 indicates that table 0 is selected and that the difference position is 0. Another method of determining the previous position may be determined mathematically when the level of the current coefficient is greater than the previous coefficient by the following equation: previous position $\times 4^{(level\ of\ x\ -\ level\ for\ previous\ coefficient)}$. In this case, the previous position is $0 \times 4^{2-0}$ equals 0.

The next significant coefficient encountered in the tree is the coefficient 54l. The coefficient 54l is located at address (2,2). Referring to the tables of FIG. 11, because the level of the previous coefficient 54j is two, the Huffman table 2 is selected. The code associated with the current level 2 of the coefficient is transmitted from the table 2. The difference position is calculated as (2,2)−(2,0)=2. Therefore, the encoding of this address is given by table 2 with the difference being 2 as indicated in table 1200 of FIG. 12. The next significant coefficient encounter by the depth first traversal process of the system of the present invention is the coefficient 52xx. The coefficient 52xx is located at address (1,1). The coefficient 52xx is located at a level that is less than the previous level. In this case the difference for the coefficient 54l is taken from the ancestor of the coefficient 54l that is on the same level as the current coefficient, 52xx. In this case, the coefficient used for taking the difference measurement is the coefficient 52ww which is the ancestor of the previous coefficient that is at the same level as the significant coefficient being evaluated. In this case, the coefficient 52ww has an address (1,0). Thus, the difference value determined for the encoding of the coefficient 52xx is (1,1)−(1,0)=1. Therefore, the Huffman table 2 and the difference 1 is used for encoding the position of the coefficient (1,1). Another method of determining the previous position for the last significant coefficient may be determined by integer dividing the previous position by $4^{(level\ of\ previous\ coefficient\ -\ the\ the\ level\ of\ x)}$. In integer division, only the whole number portion of the dividend is maintained. Thus for the coefficient 52xx the calculation for the previous position equals $2 \div 4^{(2-1)}$. This calculation yields: 2÷4=0.5 which equals 0 using integer division. The remaining Huffman tables and difference values determined for the significant coefficients illustrated in FIG. 10 are shown in the table of FIG. 12.

Figure 13:
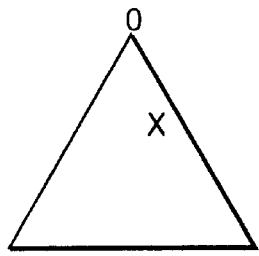
FIG. 13 is a diagram that illustrates an embodiment of the present invention that indicates whether a particular tree should be traversed.
Figure 13:
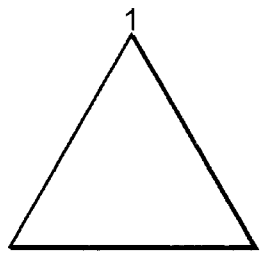
Figure 13:
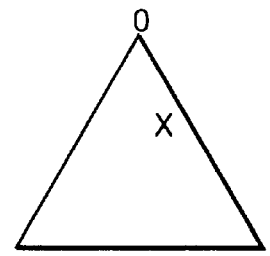

As noted above, there are a certain number of trees to be evaluated for a particular subband. In the example discussed in FIG. 2, twelve coefficients serve as roots for trees. Therefore there are twelve trees in the subband decomposition defined in FIG. 2. The system of the present invention evaluates each tree in order. The system of the present invention run-length encodes the trees by assigning a tree with significant coefficients, the value "0" and assigning trees with no significant coefficients a value of "1". When the process encounters a tree designated by the run length code 0, the process evaluates the coefficients. When the system encounters a tree designated with a 1, the system does not evaluate the coefficients of that tree. Because there are multiple trees, the process of the present invention must account for determining the difference and address positions for coefficients in which the previous significant coefficient is located in a different tree than the current significant coefficient. FIG. 13 shows an example of run length encoded trees. The trees 1310 and 1316 have at least one significant coefficient and are therefore labeled with the non-empty tree indicator "0". The tree 1312 does not have any significant coefficients and is therefore labeled with the empty tree indicator "1".

Figure 14A:
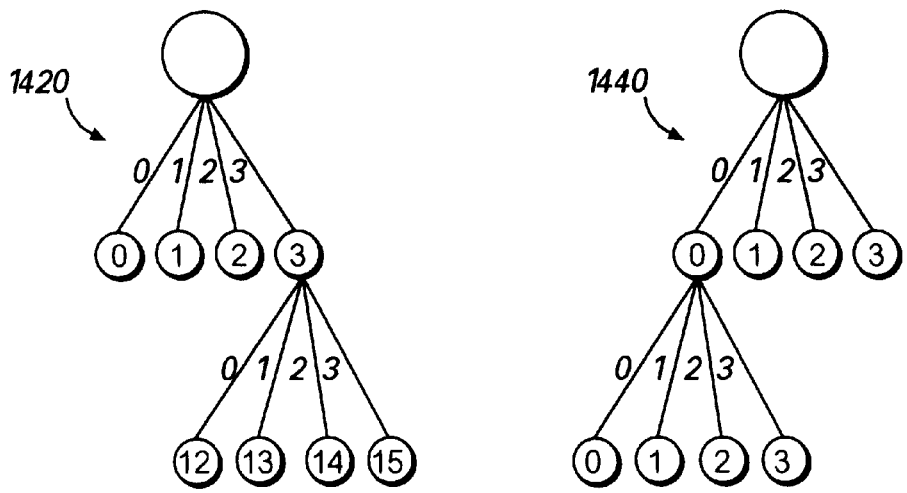
FIGS. 14a–b are diagrams that show the manner in which difference in positions of coefficients in separate trees is determined.
Figure 14B:
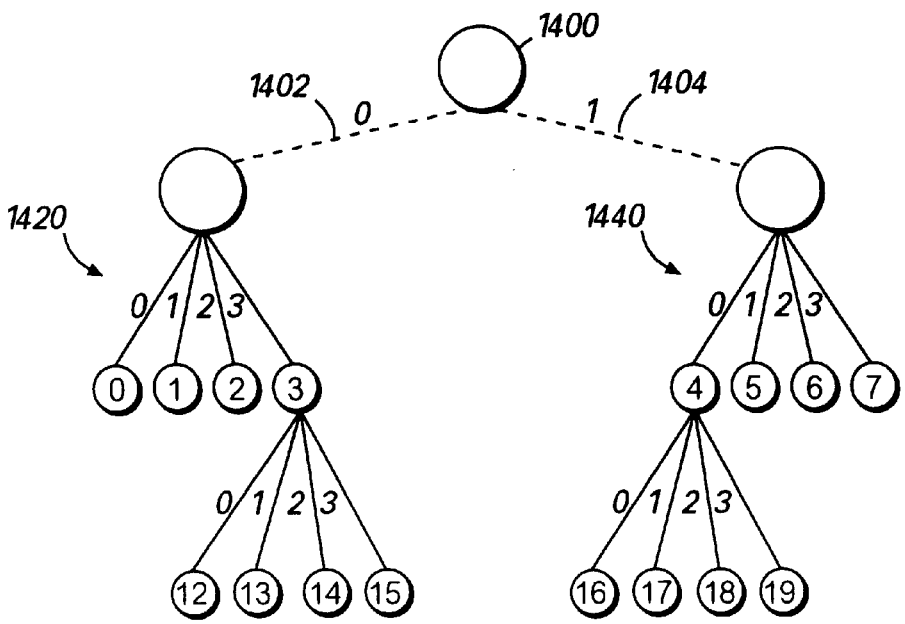

Referring to FIGS. 14a and 14b, FIG. 14a shows two tree 1420 and 1440 for which the difference between significant coefficients are determined. The system of the present invention select a Huffman based on the levels as discussed above in connection with FIGS. 10, 11 and 12. However, in order to determine the difference in the position variable of the address, the system of the present invention considers the position variables of successive trees to be continuous throughout the entire level although the coefficients may b e located in different trees.

Referring to FIG. 14b, the manner in which the coefficient positions are determined in successive trees is illustrated. The position of the first child coefficient encountered in the tree 1440 in level 1 is assigned the position 4. This position 4 is labeled in sequence with respect to the last child node encountered at the same level from the previous tree 1420. Therefore, the numbering of the position variables for the second tree is continuous. The coefficient positions of the second tree in subband level 1 are labeled 4, 5, 6 and 7. Therefore, the difference value calculated for the first identified significant coefficient at address (1, 1) within the tree 1440 is considered to be at position 5 of level 1. Thus, the difference transmitted is 5−2=3. As discussed herein, the positions of coefficients may be determined as base 4 number. For determining the position of successive trees, a hypothetical node may be considered. As illustrated in FIG. 14b, a hypothetical node 1400 is illustrated as the parent node for the successive trees that have significant coefficients. Additionally, the paths, 1402 and 1404, leading to the trees are labeled with 0 and 1 respectively. Therefore, the position of the first significant coefficient of the second tree can be determined by the base four representation $(1\ 1)_4 = 5$.

Encoding Processes for a Wavelet Transform

The preferred steps of the method for encoding a wavelet transform is shown in flow diagrams 15a, 15b, 15c and 15d. The steps of the preferred method are implemented with computer programs operating on the computer system 64 as discussed above. The preferred steps are discussed in conjunction with the other FIGS.

Referring to FIGS. 15a, 15b, 15c and 15d, a more detailed description of the processes of the present invention is discussed. The process begins at step 1502. At step 1502, the LL subband coefficients are stored to the first significance index list (SI index list). The process proceeds to step 1504 where the initial k-plane and threshold T are set. The initial k-plane is set to equal the upper ceiling [log 2 (max)] minus 2. The upper ceiling is the smallest integer greater than or equal to some number. For example, the upper ceiling of 4.3 is five. Max is the maximum of magnitude of all coefficients in the wavelet transform of a number. Preferably, the initial threshold T is set to $2^k$. Having set the initial k plane and the threshold T, the process proceeds to step 1508. The process then proceeds to step 1508. At step 1508, the sign bits of the coefficients are transmitted as well as "k+1" plane bits of the LL coefficients. Steps 1502 through 1508 are the initialization steps for beginning the encoder process.

Figure 15A:
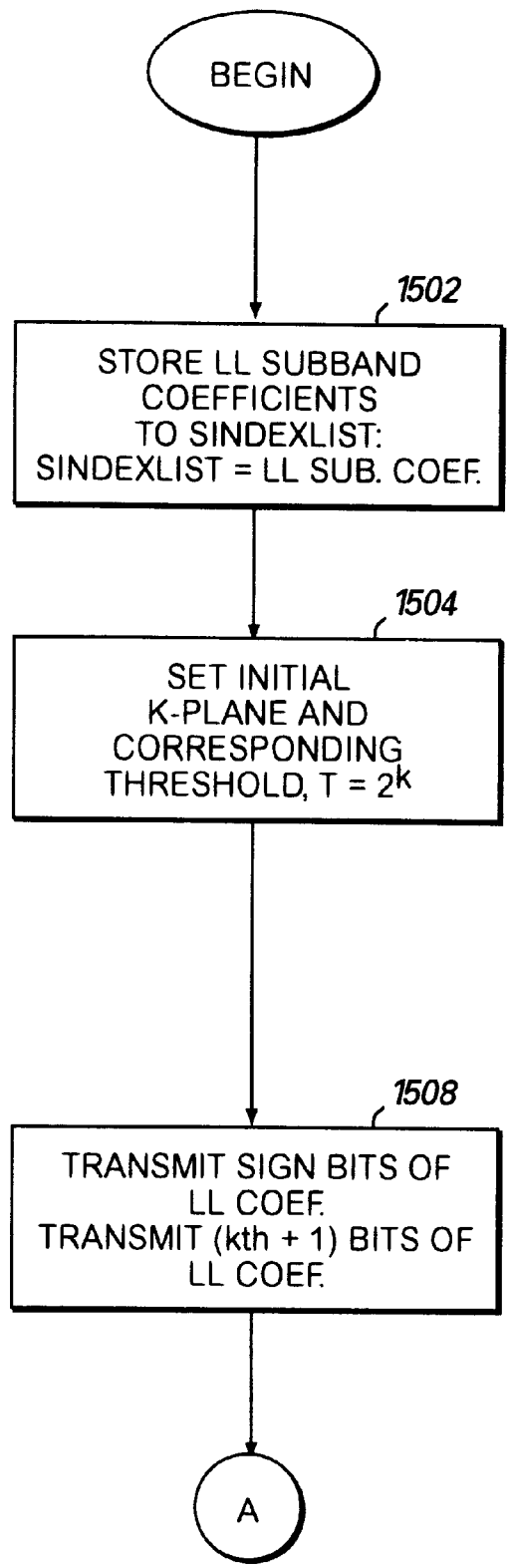
FIGS. 15–16c are flow diagrams of the processes of the present invention.
Figure 15B:
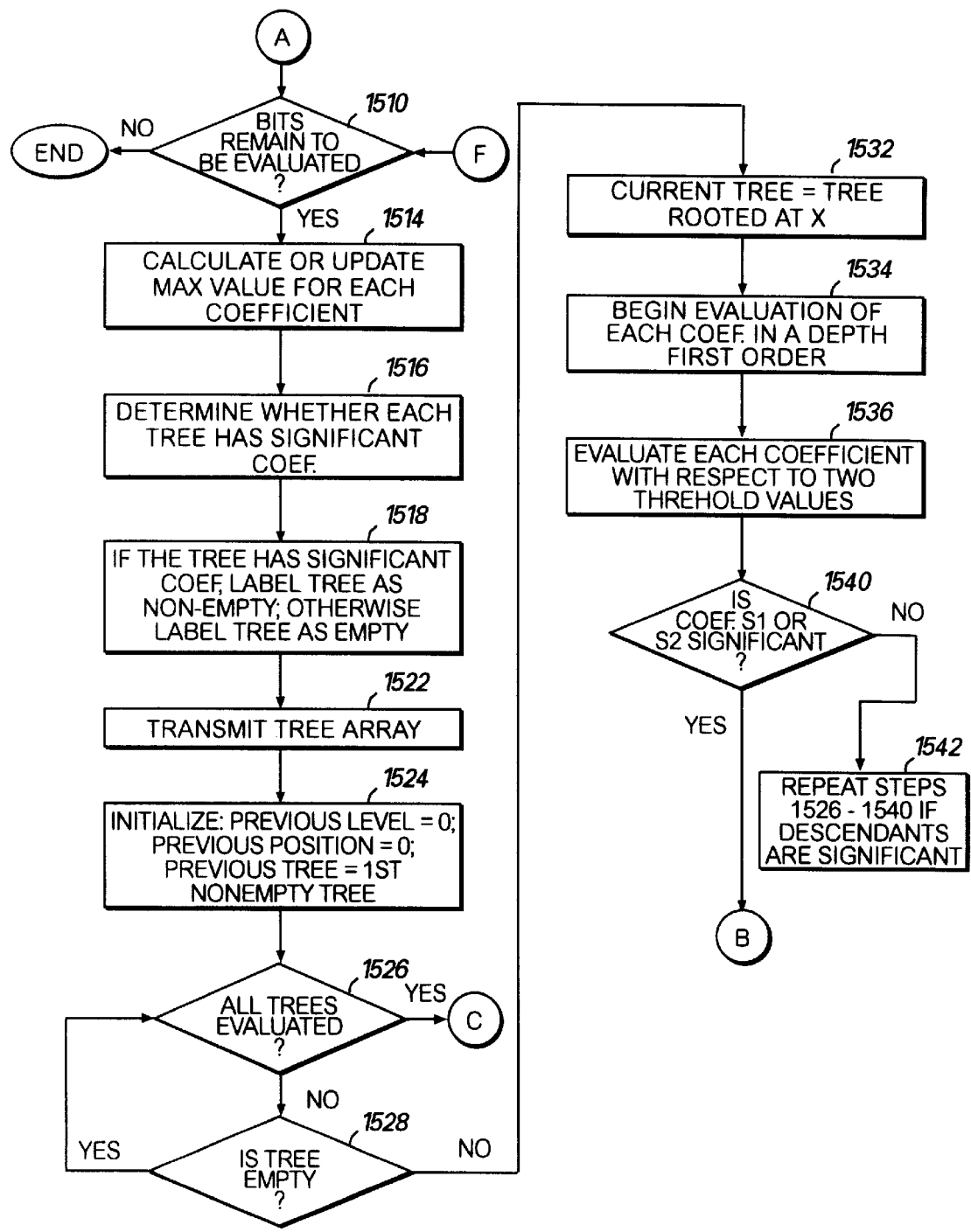
Figure 15C:
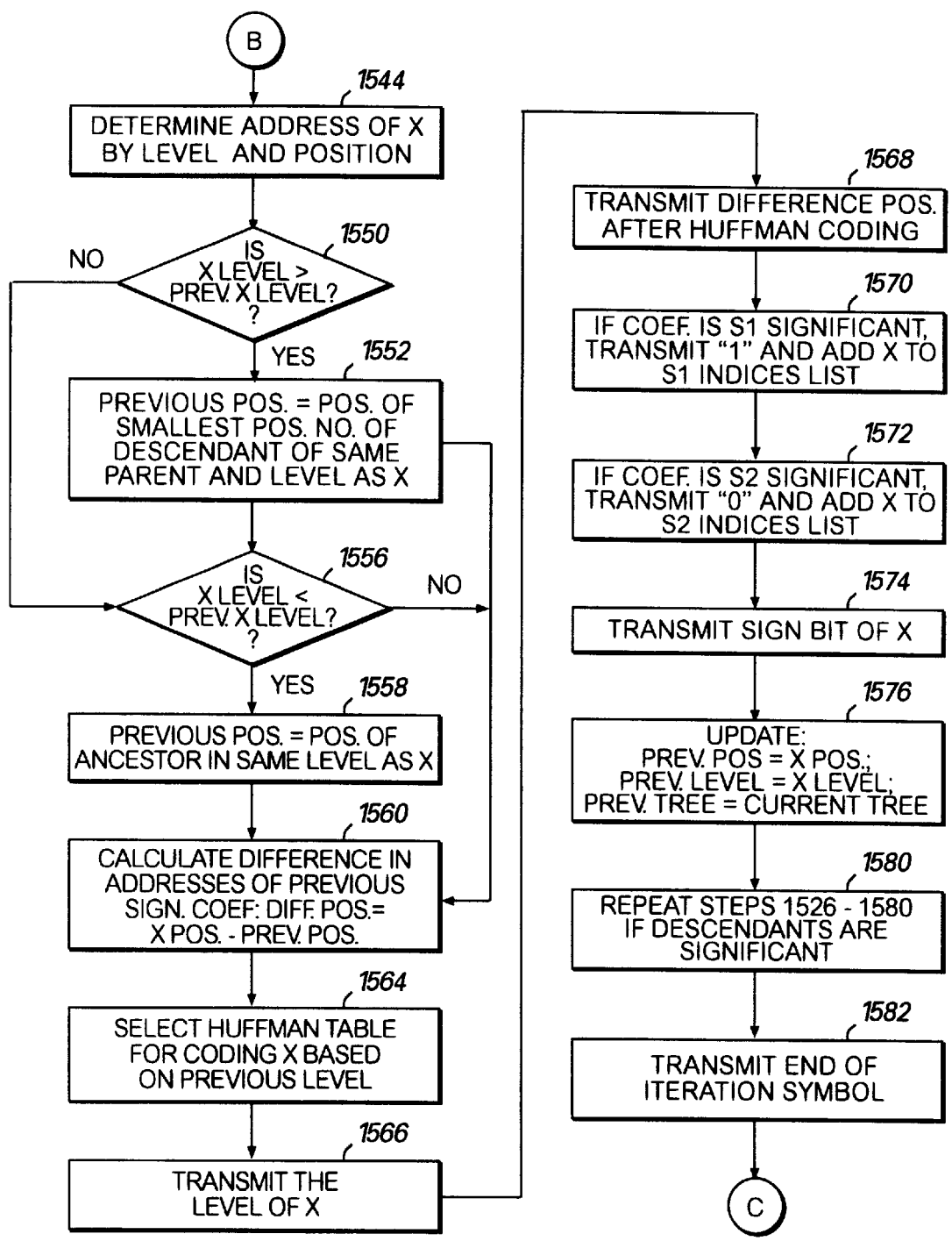

The process then proceeds to step 1510 of FIG. 15b. At step 1510, the beginning of the iteration loop for the encoder begins. At step 1510, the process determines whether bits are available for encoding and whether k is greater than or equal to 0. If the bit budget designated by the user has been exceeded or if k is less than 0, the iteration process begins. However, if the encoded bits is within budget and if k is greater than or equal to 0, the process proceeds to step 1514. At step 1514, the maximum value (max value) is calculated for each coefficient. This max value is used for comparison against the threshold to determine whether descendants of the coefficient being evaluated are significant. The process then proceeds to step 1516. At step 1516, the process determines which trees have significant coefficients. This is determined by threshold, the tree has at least one significant coefficient. The process then proceeds to step 1518. At step 1518, the process run lengths encodes the trees. If there are significant coefficients in the tree, the tree is labeled as a non-empty tree. If however, the tree does not have any significant coefficient, the tree is labeled as an empty tree. The process then proceeds to step 1522. At step 1522, the process transmits the tree say of empty/non-empty labels to the decoder.

At step 1524, the process initializes the initial variables for determining the previous level, previous position, and previous tree. The previous level and previous position are each set to 0. The previous tree variable is set to equal the first non-empty tree. The process then proceeds to step 1526. At step 1526, the process determines whether all trees have been evaluated. If all trees have been evaluated, the process proceeds to step 1583 of FIG. 15d. However if at step 1526, all trees have not been checked the process proceeds to step 1528. At step 1528, the current tree is checked to see whether or not it is an empty tree. If the current tree is an empty tree, the process proceeds to step 1526 where the next tree is obtained and evaluated. If at step 1528, the tree is not an empty tree, the process proceeds to step 1532. At step 1532, a current tree variable is set to equal the tree rooted at x. The process proceeds to step 1534. At step 1534, the traversal of the tree in a depth-first order is begun. At step 1536, the coefficient is evaluated to determine whether the coefficient is significant with respect to either of the two thresholds, SI and S2. The process proceeds to step 1540. At step 1540, the process determines whether the coefficient is either S1 or S2 significant. If neither coefficient is S1 or S2, the process proceeds to step 1542. At step 1542, the process determines if any descendants are significant by repeating the step 1526 and steps following 1540 if necessary. If at step 1540, the coefficient is either S1 or S2 significant, the process proceeds to step 1544. At step 1544, the process determines the address of x by its level and position. The process proceeds to step 1550. At step 1550, the process determines whether the level of the coefficient x is greater than the level of the previous significant coefficient. If the level of the coefficient x is greater than the level of the previous significant coefficient, the process proceeds to step 1552. At step 1552, the previous position is set to equal the position of the smallest position number of the descendant of the previous coefficient at the same level as x and that has the same parent as x. The process then proceeds to step 1560.

If at step 1550, if the level of x was not greater than the previous level, the process proceeds to step 1556. At step 1556, the process determines whether the level of x is less than the previous level. If the level of x is less than the previous level, the process proceeds to step 1558. At step 1558, the previous position is set to equal the position of the ancestor of the previous significant coefficient that is at the same level as x. The process then proceeds to step 1560. However, if at step 1556, the level at the current x was not less than the previous significant coefficient level, this indicates that the level of the current significant coefficient is at the same level as the previous significant coefficient and the process proceeds to step 1560. At step 1560, the process determines the difference position from the current significant coefficient and the previous significant coefficient. This difference position may be determined by subtracting the previous position from the current position of x. If the current tree and the previous tree are different. The difference position is further determined as discussed above or by the equation: difference position=difference position+$4^{(level\ of\ x)}$.

The process then proceeds to step 1564. At step 1564, the Huffman table for coding x based on the previous level is selected. The process then proceeds to step 1566. At step 1566, the level of x is transmitted. At step 1568, the difference position is transmitted after Huffman encoding. The process then proceeds to step 1570.

At step 1570, if the coefficient is SI significant, the process transmits the binary number 1 and adds x to the S1 indices list. At step 1572, if the coefficient is S2 significant, the process transmit the binary number 0 and adds x to the S2 indices list. The sign bit of x is transmitted at step 1574. At step 1576, the previous position, previous level, and previous tree are all updated to the current position of x, the current level of x and the current tree of x, respectively. The process then proceeds to step 1580. At step 1580, the steps 15 through 32 are repeated if any descendants are significant. The process then proceeds to step 1582 where an end of iteration symbol is transmitted to the decoder.

FIG. 15*d* illustrates the processes used to transmit refinement bits of coefficient that have been discovered to be significant in previous iterations. The processes of FIG. 15 may be termed the least significant bit pass (LSB). In the LSB pass, the following less significant bit, with respect to the two bits evaluated for SI and S2 significance, of the coefficient being evaluated is sent to the decoder. At step 1583, the significance index list is updated. Here, the indices of the coefficients of the first temporary list are added to the significance index list. The indices of the first temporary list indicate the location of coefficients found to be significant with respect to the first threshold. The process then proceeds to step 1584. At step 1584, the process transmits kth plane bits of the significance index list. The process then proceeds to step 1586. At step 1586, the significance index list is updated again. However, the S index list is now updated to include the indices of the second temporary list. The indices of the second temporary list indicate the location of the coefficients found to be significant with respect to the second threshold. The process then proceeds to step 1590. At step 1590, the process transmits to the decoder corresponding to the k–1th plane bits of the significance index list. The process then proceeds to step 1592 where the threshold is updated by dividing the threshold by four. The process then proceeds to step 1594 where the k-plane level is updated. The plane level is subtracted by two to form the new updated plane level. The process then proceeds to step 1510 of FIG. 15*b*. As discussed above, if the bit budget is exceeded or k is less than zero the process ends. The process as described in connection with FIGS. 15*a*, 15*b*, 15*c* and 15*d* describe the encoder process utilized in connection with the present invention.

Figure 16B:
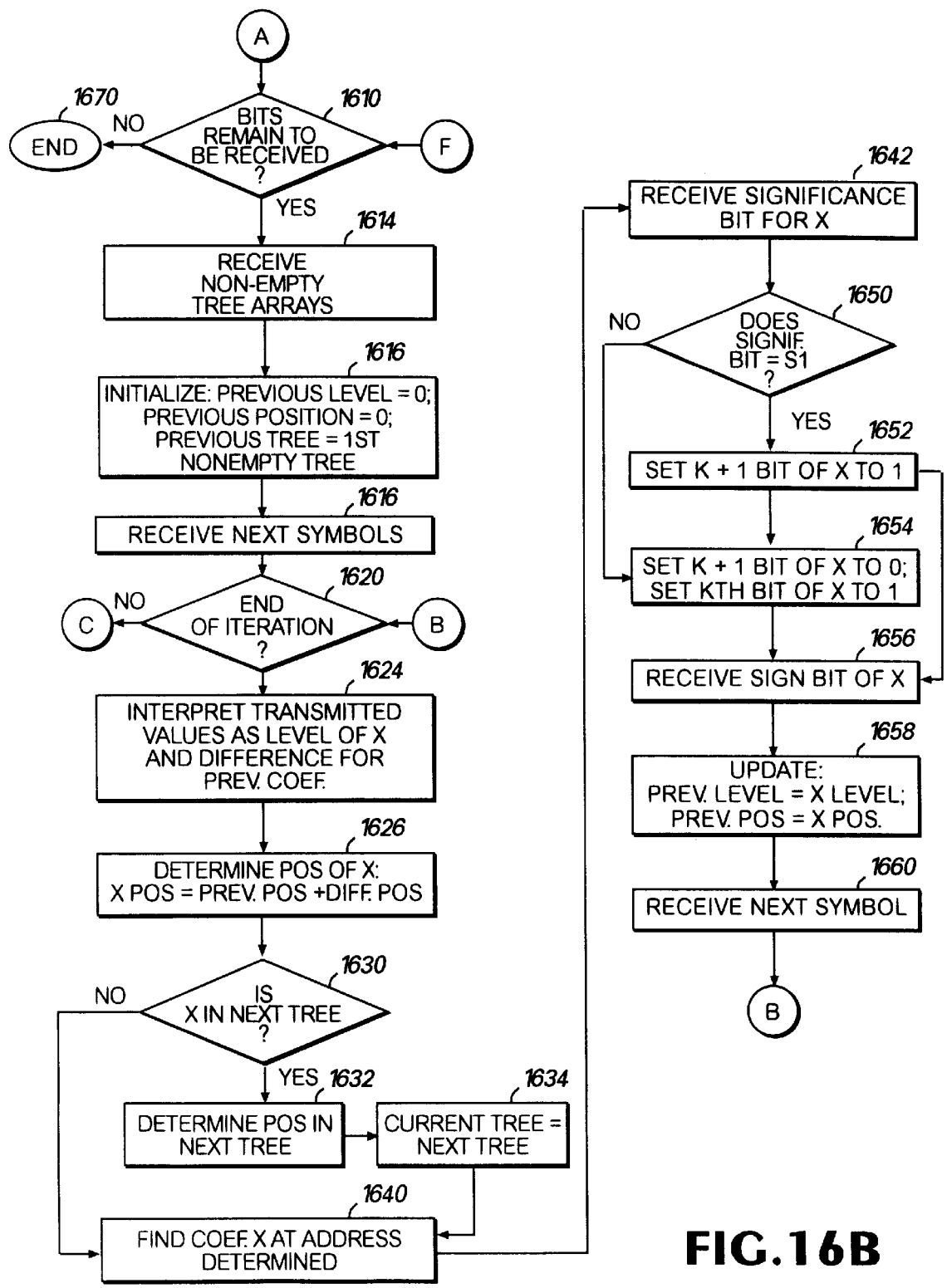

Referring to FIG. 16*a*, the initialization procedures for the decoder is discussed. At step 1602, all reconstructed discrete wavelet transform coefficients are initialized to zero. The process then proceeds to step 1604 where the initial condition of the significance list, SI index list, is initialized with the LL subband coefficient indices. The process then proceeds to step 1606. At step 1606, the initial k-plane and the threshold value are received. At step 1608, the LL coefficient information is received including the sign bits of the LL coefficients and the "k+1"th bits of the LL coefficients. The process then proceeds to step 1610 of FIG. 16*b*.

Figure 16C:
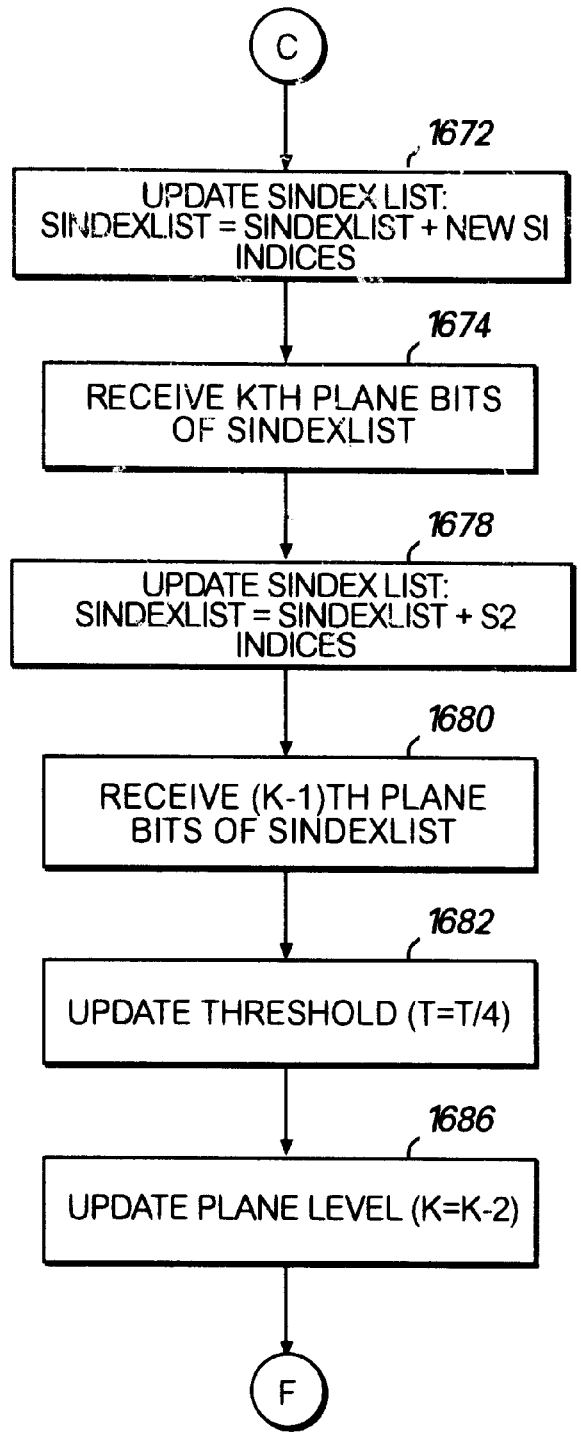

At step 1610, the main iteration loop for the decoder begins. At step 1610, the process determines whether bits remain to be evaluated. If bits do not remain to be evaluated, the decoding process ends at step 1670. However, if at step 1610 bits remain to be evaluated, the process proceeds to step 1614 where the non-empty tree arrays are received. The process then proceeds to step 1616. At step 1616, the previous level, previous position and current tree are initialized. The previous level and the previous position are initialized to zero. The current tree is initialized to the first non-empty tree. The process proceeds to step 1618. At step 1618, the process receives the next set of symbols. The process proceeds to step 1620 where the system checks whether the end of iteration symbol has been received. If the end of iteration symbol has been received, the process proceeds to step 1672 of FIG. 16*c*.

If, however, the end of iteration symbol has not been received at step 620, the process proceeds to step 1624. At step 1624, the transmitted symbols or values are interpreted as a corresponding level for x and the difference position is calculated. At step 1626, the position of x is determined using the difference value calculated. The position of x equals the previous position plus the difference position. The process proceeds to step 1630. At step 1630, the process determines whether the position of x is in the next tree. If the position of x is in the next tree, the process proceeds to step 1632. At step 1632, the x position is adjusted to account for the position in the next tree and proceeds to step 1634. If at step 1630, the process of x is same tree, the process proceeds to step 1634. At step 1634, the current tree is set to equal the next nonempty tree. The process then proceeds to step 1640. If at step 1630, the position of x is not in the next tree, the process proceeds to step 1640.

At step 1640, the process locates the coefficient x at the address determined. The process then proceeds to step 1642.

At step 1642, the process receives the significance bit for the coefficient x. At step 1650, the process determines whether the significance bit is equal to S1. If the significance bit is equal to S1, the process proceeds to step 1652. At step 1652, the k+1 bit of x is set to 1. The process then proceeds then to step 1656. If at step 1650, the significant bit did not equal S1, the process proceeds to step 1654. If the decoder processes reaches step 1654, this indicates that the significance bit equals S2. At step 1654, the k+1 bit of x is set to 0 and the k bit of x is set to 1. The process then proceeds to step 1656.

At step 1656, the sign bit of x is received. The process then proceeds to step 1658 where the previous level is updated to the current level of x and the previous position is updated to the current position of x. The process then process to step 1660. At step 1660, the next symbols as transmitted from the encoder are received. The process then proceeds to step 1620 where it is determined whether an end of iteration symbol has been received. If an end of iteration symbol is received, the process proceeds to step 1672. At step 1672, the significance index list is updated to include the new indices of the S1 coefficients. The process then proceeds to step 1674. At step 1674, the process receives the kth plane bit of the significant of the significance index list. The process then proceeds to step 1678. At step 1678, the significance index list is updated to include the indices of the S2 coefficients. The process then proceeds to step 1680 where the k−1th plane bits of the significance index list are received. At step 1682, the threshold is updated by dividing the threshold by four. The process then proceeds to step 1686. At step 1686, the k-plane level is updated by subtracting the k-plane level by two. The process then proceeds to step 1610, to determine whether bits remain to be received.

While the present invention has been illustrated by the description of the preferred and alternative embodiments and while the embodiments have been described in considerable detail, it is not the intention of the applicants to restrict or anyway limit the scope of the appended claims to such detail. Additional advantages and modifications will readily appear to those skilled in the art. The invention's broader aspects are therefore not limited to the specific details, represented apparatus and method, an illustrative example shown and described. Accordingly, departures may be made from such details without departing from the spirit or scope of applicant's general inventive concepts.

What is claimed is:

1. A method of coding a hierarchical subband system of coefficients of a wavelet transform that is representative of an image, said wavelet transform comprising coefficients organized in a plurality of frequency subbands representative of the decomposition of an image, each of said subbands representative of a different level of frequency detail of said image, said subbands having coefficients at a same orientation and having coefficients at a same spatial location as other of said subbands, said coefficients being operable for association among said coefficients by a tree structure, said tree structure relating a coefficient of a subband of a coarser level of detail to coefficients of a subband of a finer level of detail, a coefficient in a coarser subband being defined as a parent and coefficients corresponding to the same spatial location at the next finer scale from said coarse scale of similar orientation being children and the children of children being grandchildren and the set of coefficients, at a finer scale than a coarser scale, of similar orientation corresponding to the same spatial location within the subband being descendants, said method comprising the steps of:

receiving said coefficients of said wavelet transform;

selecting a first plurality of thresholds ranges;

comparing a first coefficient of said tree structure against said plurality of threshold ranges during a first single traversal of said tree structure;

comparing a second coefficient of said tree structure against said plurality of threshold ranges during said first single traversal of said tree structure;

determining whether said first or second coefficient satisfies a selected condition with respect to either of said threshold ranges;

determining the difference in addresses between the addresses of said first and second coefficients if said first and second coefficient satisfy said selected condition; and coding the location of said second coefficient based on the address of said first coefficient using said difference.

2. The method of claim 1 further comprising the step of utilizing Huffman tables to code said symbols.

3. The method of claim 1 wherein said step of selecting said plurality of threshold ranges comprises establishing an initial threshold value, T, from which said threshold ranges are selected.

4. The method of claim 3 wherein said step of selecting said plurality of threshold levels comprises selecting a first threshold level for coefficients that have a magnitude that is between T and 2T and selecting a second threshold level for coefficients that have a magnitude that is between 2T and 4T.

5. The method of claim 1 wherein the step of coding said coefficients comprises coding a coefficient with a first symbol that indicates if said coefficient is located in a particular one of said ranges, coding said coefficient with a second symbol if said coefficient is in a second of said ranges.

6. A method of providing addresses for a hierarchical subband system of coefficients of a wavelet transform that is representative of an image, said wavelet transform comprising coefficients organized in a plurality of frequency subbands representative of the decomposition of an image, comprising the steps of:

locating coefficients in a subband;

providing a level parameter for coefficients that indicates the subband level in which a coefficient is located;

providing a position parameter for coefficients that associates a coefficient with a unique position of said coefficient within said level;

said level and position parameters being used as address identifiers for identifying selected coefficients in said subband;

determining the difference in addresses between said selected coefficients using said address identifiers if the selected coefficients satisfy a certain condition; and coding the location of at least one of the selected coefficients based on the difference determined in said step of determining.

7. A method of coding a hierarchical subband system of coefficients of a wavelet transform that is representative of an image, said wavelet transform comprising coefficients organized in a plurality of frequency subbands representative of the decomposition of an image, each of said subbands representative of a different level of frequency detail of said image, said subbands having coefficients at a same orientation and having coefficients at a same spatial location as other of said subbands, said coefficients being operable for association among said coefficients by a tree structure, said tree structure relating a coefficient of a subband of a coarser level of detail to coefficients of a subband of a finer level of detail, a coefficient in a coarser subband being defined as a parent and coefficients corresponding to the same spatial location at the next finer scale from said coarse scale of similar orientation being children and the children of children being grandchildren and the set of coefficients, at a finer scale than a coarser scale, of similar orientation corresponding to the same spatial location within the subband being descendants, said method comprising the steps of:

traversing said coefficients of said tree in an ordered sequence;

comparing a first coefficient at a first address of said wavelet transform to a threshold value;

comparing a second coefficient at a second address of said wavelet transform to said threshold value;

determining whether said first and second coefficient satisfies a selected condition with respect to said threshold;

determining the difference in addresses between the addresses of said first and second coefficients if said first and second coefficient satisfy said selected condition; and coding the location of said second coefficient based on the address of said first coefficient using said difference determined in said step of determining.

8. The method of claim 7 further comprising the step of assigning two parameters to each of said coefficients, said two parameters collectively identifying the address of a particular coefficient.

9. The method of claim 8 wherein said step of assigning said two parameters comprises assigning a level parameter to indicate a level in which said coefficient is located in the hierarchical subband and assigning a position parameter to indicate a position of said coefficient within said level.

10. The method of claim 9 further comprising the step of assigning an ordered set of symbols to each association between a parent coefficient and a child coefficient and wherein said set of symbols are operable to be used to calculate the position parameter of the said child coefficient.

11. The method of claim 10 wherein each parent coefficient has only four children coefficients associated therewith and wherein said associations are labeled with the ordered sequence 0, 1, 2, and 3, respectively.

12. The method of claim 7 further comprising examining a plurality of said trees of coefficients and wherein said step of coding occurs in selected ones of said trees.

13. The method of claim 7 further comprising determining which of said trees have at least one coefficient that satisfies said first condition and designating the coefficients of said trees that satisfy said first condition to be encoded.

14. The method of claim 12 wherein an indicator is provided to indicate which of said trees have coefficients that should be encoded and evaluating the coefficients of said trees that have an indicator provided therefor.

15. The method of claim 12 further comprising labeling the positions of coefficients occurring in the same level of two different trees in a continuous consecutive order from the first tree to the second tree.

* * * * *